United States Patent
Harshman et al.

(10) Patent No.: US 7,326,340 B2
(45) Date of Patent: Feb. 5, 2008

(54) SYSTEM FOR CONTROLLING SULFIDE GENERATION

(75) Inventors: James Paul Harshman, Bradenton, FL (US); David J. Hunniford, Sarasota, FL (US); David L. Morano, Sarasota, FL (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 271 days.

(21) Appl. No.: 11/149,018

(22) Filed: Jun. 9, 2005

(65) Prior Publication Data

US 2005/0224409 A1    Oct. 13, 2005

Related U.S. Application Data

(63) Continuation-in-part of application No. 10/700,381, filed on Nov. 4, 2003, now Pat. No. 7,087,172.

(60) Provisional application No. 60/451,671, filed on Mar. 5, 2003.

(51) Int. Cl.
C02F 3/00    (2006.01)

(52) U.S. Cl. .................... 210/198.1; 210/743; 210/739

(58) Field of Classification Search ............. 210/198.1, 210/743, 739
See application file for complete search history.

(56) References Cited

U.S. PATENT DOCUMENTS

| | | |
|---|---|---|
| 221,232 A | 11/1879 | Hirsh |
| 1,701,825 A | 2/1929 | Seil |
| 1,997,252 A | 4/1935 | Fischer |
| 3,219,576 A | 11/1965 | Makabe |
| 3,300,404 A | 1/1967 | Howe et al. |
| 3,401,113 A | 9/1968 | Pruessner et al. |
| 3,502,566 A | 3/1970 | Raymond et al. |
| 3,607,736 A | 9/1971 | Miyaji |
| 3,639,263 A | 2/1972 | Troschinski et al. |
| 3,867,284 A | 2/1975 | Kappe et al. |
| 3,930,998 A | 1/1976 | Knopp et al. |
| 3,959,127 A | 5/1976 | Bartha et al. |
| 3,959,130 A | 5/1976 | Kloster et al. |
| 3,966,450 A | 6/1976 | O'Neil et al. |
| 4,098,690 A | 7/1978 | Semmens |
| 4,108,771 A | 8/1978 | Weiss |
| 4,115,258 A | 9/1978 | Smith et al. |

(Continued)

FOREIGN PATENT DOCUMENTS

DE    34 14556 A1    10/1985

(Continued)

OTHER PUBLICATIONS

"Effect of Nitrate on Biogenic Sulfide Production," *Applied and Environmental Microbiology*, Jun. 1986, vol. 51, No. 6, pp. 1205-1211, 7 pages.

(Continued)

*Primary Examiner*—Chester T. Barry

(57) ABSTRACT

Systems and methods for reducing odors utilizes oxidation-reduction potential to characterize the quality of water or wastewater and control addition of a species thereto that reduces or inhibits biological sulfide generation. Oxidation-reduction potential is measured at a downstream station and, based on the measurement, a nitrate compound is added at an upstream station to promote inoffensive biological products instead of foul-smelling products.

18 Claims, 10 Drawing Sheets

U.S. PATENT DOCUMENTS

| | | | |
|---|---|---|---|
| 4,148,726 | A | 4/1979 | Smith |
| 4,153,547 | A | 5/1979 | McLean |
| 4,224,154 | A | 9/1980 | Steininger |
| 4,297,216 | A | 10/1981 | Ishida et al. |
| 4,446,031 | A | 5/1984 | List |
| 4,501,668 | A | 2/1985 | Merk et al. |
| 4,505,819 | A | 3/1985 | Barnes et al. |
| 4,566,469 | A | 1/1986 | Semp et al. |
| 4,612,124 | A | 9/1986 | Escrig |
| 4,680,127 | A | 7/1987 | Edmondson |
| 4,681,687 | A | 7/1987 | Mouché et al. |
| 4,725,405 | A | 2/1988 | Cassin et al. |
| 4,760,027 | A | 7/1988 | Sublette |
| 4,818,404 | A | 4/1989 | McDowell |
| 4,911,843 | A | 3/1990 | Hunniford et al. |
| 5,045,213 | A | 9/1991 | Bowers |
| 5,200,092 | A | 4/1993 | Richards et al. |
| 5,298,174 | A | 3/1994 | Momont et al. |
| 5,336,431 | A | 8/1994 | Richards et al. |
| 5,385,842 | A | 1/1995 | Weimer et al. |
| 5,480,550 | A | 1/1996 | Sublette |
| 5,482,630 | A | 1/1996 | Lee et al. |
| 5,500,368 | A | 3/1996 | Tatnall |
| 5,603,832 | A | 2/1997 | Høyvik et al. |
| 5,733,456 | A * | 3/1998 | Okey et al. ................. 210/605 |
| 5,833,864 | A | 11/1998 | Miller et al. |
| 5,948,269 | A | 9/1999 | Stone |
| 5,984,993 | A | 11/1999 | Mainz et al. |
| RE36,651 | E | 4/2000 | Hunniford et al. |
| 6,045,695 | A | 4/2000 | Janssen et al. |
| 6,059,973 | A | 5/2000 | Hudson et al. |
| 6,146,522 | A | 11/2000 | Fernholz et al. |
| 6,221,652 | B1 | 4/2001 | Janssen et al. |
| RE37,181 | E | 5/2001 | Hunniford et al. |
| 6,302,779 | B1 * | 10/2001 | Ryan et al. ................... 454/61 |
| 6,309,597 | B1 | 10/2001 | Ballinger, Jr. et al. |
| 6,397,909 | B1 * | 6/2002 | Nelson ....................... 141/356 |
| 6,409,926 | B1 | 6/2002 | Martin |
| 6,410,305 | B1 | 6/2002 | Miller et al. |
| 6,419,817 | B1 | 7/2002 | Martin |
| 6,576,144 | B1 | 6/2003 | Vineyard |
| 6,620,315 | B2 | 9/2003 | Martin |
| 6,623,647 | B2 | 9/2003 | Martin |
| 6,660,163 | B2 | 12/2003 | Miklos |
| 6,716,359 | B1 | 4/2004 | Dennis, II |
| 6,773,604 | B2 | 8/2004 | Walton et al. |
| 2002/0102229 | A1 | 8/2002 | Wegner |
| 2004/0180424 | A1 | 9/2004 | Christiansen |
| 2004/0226891 | A1 | 11/2004 | Dentel |
| 2005/0115895 | A1 | 6/2005 | Simpson et al. |

FOREIGN PATENT DOCUMENTS

| | | |
|---|---|---|
| JP | 57187099 A | 11/1982 |
| JP | 10-328676 A | 12/1998 |
| JP | 11-156374 A | 6/1999 |

OTHER PUBLICATIONS

"Odor and Corrosion Control in Sanitary Sewerage Systems and Treatment Plants," EPA Design Manual, Oct. 1985, pp. 53, 60, 71, 75, 76.

"Odor Control and Olfaction," Pollution Sciences Publishing Company, pp. 85, 454, 457, undated.

"Chemical Control of Hydrogen Sulfide From Anaerobic Swine Manure," *Canadian Agricultural Engineering*, pp. 90-96, vol. 17, No. 2, Dec. 1975.

"Sewage Works Journal," published by California Sewage Works Association, Jul. 1946, vol. XVIII, No. 1, pp. 34-45.

"Industrial Odor Technology Assessment," Ann Arbor Science Publishers, Inc., pp. 117-147, 1956.

"Process Design Manual for Sulfide Control in Sanitary Sewerage Systems," U.S. Environmental Protection Agency, Oct. 1974, pp. 5-34 and 5-35.

Odor and Corrosion in Sanitary Sewage Systems and Treatment Plants, Copyright 1989, ISBN 0-8155-1192-2, pp. 59-60.

Bryan, A.C., "Experiences with Odor Control at Houston Texas," *Sew. & Ind. Wastes*, 28, 1512-1514 (1956).

Carpenter, W.T., "Sodium Nitrate Used to Control Nuisance," *Water Works and Sew.*, 79, 175 (1932).

Eliassen, R. et al., "The Effect of Chlorinated Hydrocarbons on Hydrogen Sulfide Production," *Sew. Works Jour.*, 21, 457 (1949).

Fales A.L., "Treatment of Industrial Wastes from Paper Mills and Tannery on Neponset River," *Jour. Ind. Eng. Chem.*, 21, 216 (1929).

Heukelekian, H., "Effect of the Addition of Sodium Nitride to Sewage on Hydrogen Sulfide Production and B.O.D. Redcuction," *Sewage Works Journal* 15(2):255-261 (1943).

Heukelekian, H., "Some Bacteriological Aspects of Hydrogen Sulfide Production from Sewage," *Sew. Works Journal* 20, 490 (1948).

Lawrence, W.A., "The Addition of Sodium Nitrate to the Androscoggin River," *Sew. and Ind. Wastes*, 22, 820(1950).

Lorgan, G.P. et al., "Nitrate Addition for the Control of Odor Emissions from Organically Overloaded, Super Rate Trickling Filters," 33rd Annual Purdue Ind. Waste Conf., West Lafayette, Ind. (1978).

McKinney, R.E., "The Role of Chemically Combined Oxygen in Biological Systems," *Jour. San. Eng. Div.*, proc. Amer. Soc. Civil Engr., 82 SA4, 1053 (1956).

Poduska, R.A., "Operation, Control, and Dynamic Modeling of the Tennessee Eastman Company Industrial Wastewater Treatment System," 34th Ann. Purdue Indust. Waste Conf., Lafayette, Md. (1970).

Pomeroy, R.D., "Controlling Sewage Plant Odors," *Consulting Eng.*, Feb. 101 (1963).

Pomeroy, R.D. et al., "Sulfide Occurrence and Control in Sewage Collection Systems," U.S. Environmental Protection Agency, EPA 600/X-85-052, Cincinnati, Ohio (1985).

Prakasam, T.B.S. et al., "Microbial Dentrification of a Wastewater Containing High Concentrations of Oxidized Nitrogen," Proceedings of the 31st Industrial Waste Conference, May 4-6, 1976, Purdue Univeristy.

Price, E.C. et al., "Sewage Treatment Plants Combat Odor Pollution Problems," *Water and Sew. Works*, 64-69 (1978).

Reid, G.W. et al., "Sewer Odor Studies," *Sew. and Ind. Wastes*, 28, 991 (1956).

Rodriguez-Gomez et al., "Inhibition of Sulfide Generation in a Reclaimed Wastewater Pipe by Nitrate Dosage and Denitrification Kinetics," *Water Environment Research*, vol. 77, No. 2, pp. 193-198 (Mar./Apr. 2005).

Ryan, W.A., "Experiences with Sodium Nitrate Treatment of Cannery Wastes," *Sew. Works Journal*, 17, 1227 (1956).

Santry, I.W., Jr., "Hydrogen Sulfide Odor Control Measures," *Jour. Water Poll. Control Fed.*, 38 459 (1966).

Santry, I.W., Jr., "Hydrogen Sulfide in Sewers," *Jour. Water Poll. Control Fed.*, 35, 1580 (1963).

"Standard Methods for the Examination of Water and Wastewater," 14th Ed., Amer. Pub. Health. Assn., Wash. D.C. 499-509 (1976).

Peter R. Willenbring et al., "Calcium Nitrate," (incomplete title), Oct. 1988 or earlier.

"Biochemical Oxidation of Polluted Lake Sediment with Nitrate—A New.Lake Restoration Method," (1976).

R.R. Dague, "Fundamentals of Odor Control," *Journal Water Pollution Control Federation*, 44(4):583-594 (Apr. 1972).

William H. Moss et al., "Full-scale use of physical/chemical treatment of domestic wastewater at Rocky River, Ohio," *Journal Water Pollution Control Federation*, 49(11):2,249-2,254 (Nov. 1977).

Leon S. Directo et al., "Pilot plant study of physical-chemical treatment," *Journal Water Pollution Control Federation* 649(1):2,081-2,098 (Oct. 1977).

Richard A. Poduska et al., "Successful storage lagoon odor control," *Journal Water Pollution Control Federation*, 53(3):299,310 (Mar. 1981).

Pomeroy, Johnston and Bailey, "Process Design Manual for Sulfide Control in Sanitary Sewage Systems," (Oct. 1974).

"Basic Research on Sulfide Occurrence and Control in Sewage Collection Systems," National Technical Information Service, a-5 (Feb. 28, 1969).

Beardsley, C.W. et al., "Removal of Sewer Odors by Scrubbing with Alkaline Solutions," *Sewage and Industrial Wastes*, vol. 30, 220 (1958).

Lang, M., "Chemical Control of Water Quality in a Tidal Basin," *Journal WPCF*, 1410-1418 (1966).

Sanborn, N.H., "Nitrate Treatment of Cannery Waste," *The Fruit Products Journal and American Vinegar Industry* (1941).

"Methods for Chemical Analysis of Water and Wastes," U.S. Environmental Protection Agency (1974).

Painter, H.A., "A Review of Literature on Inorganic Nitrogen Metabolism in Microorganisms," Water Research, *The Journal of the International Association on Water Pollution Research*, vol. 4, No. 6 (1970).

Pomeroy, R.D. et al., "Feasibility Study on In-Sewer Treatment Methods," Municipal, Environmental Research Lab, Chapter 6, "Chemical Treatment," 77 (1977).

Thistlethwayte, D.K.B., "The Control of Sulphides in Sewerage Systems," Ann Arbor Science Publishers, Inc., Chapter 13, "Corrective Measures for Existing Systems," 159 (1972).

Vulcan Chemicals, Technical Data Sheet, "Hydrogen Sulfide Control in Wastewater Collection Systems," TDS 642-402, 1 pg., publication date unknown.

"Water Supply and Sewerage," Ernest W. Steel, Chapter 27, pp. 600-601 (4$^{th}$ Ed. 1960).

USFilter Corporation, Strantrol MG/L 5 Controller, Data Sheet, 2004.

USFilter Wallace & Tiernan Worldwide, Multi Function Analysers Depolox 4, Technical Information, 1999.

* cited by examiner

SYSTEM FOR CONTROLLING SULFIDE GENERATION

CROSS-REFERENCE TO RELATED APPLICATION

This application is a continuation-in-part of, and claims the benefit under 35 U.S.C. § 120 to, U.S. application Ser. No. 10/700,381, entitled "METHODS AND APPARATUS FOR REDUCING NITRATE DEMANDS TN THE REDUCTION OF DISSOLVED AND/OR ATMOSPHERIC SULFIDES IN WASTEWATER," filed on Nov. 4, 2003 now U.S. Pat. No. 7,087,172, which claims the benefit under 35 U.S.C. § 119 to U.S. Provisional Patent Application No. 60/451,671, filed on March 5, 2003, each of which is herein incorporated by reference in its entirety.

BACKGROUND OF INVENTION

1. Field of Invention

This invention relates to water streams containing odorous species and, in particular, to controlling dissolved sulfide concentrations by using a dose to demand model based on an oxidation reduction potential of the water stream to vary a feed rate of a salt introduced to the water stream.

2. Discussion of Related Art

It is known to add nitrates or nitrites, and/or anthraquinone, to sewage to suppress the formation of dissolved sulfides via anaerobic bacterial action. For example, Howe et al., in U.S. Pat. No. 3,300,404, disclose anaerobic treatment of organic industrial wastes in an artificial lagoon; List, in U.S. Pat. No. 4,446,031, discloses sewage treatment composition, its manufacture, and its use; Mouché et al., in U.S. Pat. No. 4,681,687, disclose the use of alkali metal nitrates to inhibit $H_2S$ formation in flue gas desulfurization system sludges; and Tatnall, in U.S. Pat. No. 5,500,368, discloses finely divided anthraquinone formulations as inhibitors of sulfide production from sulfate-reducing bacteria, the entire content of each being expressly incorporated hereinto by reference. Further, Ballinger, Jr. et al., in U.S. Pat. No. 6,309,597, disclose a method for reducing hydrogen sulfide level in water containing sulfate-reducing bacteria and hydrogen sulfide-metabolizing bacteria. Bowers, in U.S. Pat. No. 5,045,213, discloses a waste water treatment method and apparatus. Richards, in U.S. Pat. Nos. 5,200,092 and 5,336,431, discloses a composition and method for sulfide control. Miklos, in U.S. Pat. No. 6,660,163, discloses waste treatment with control over biological solids. Vineyard, in U.S. Pat. No. 6,576,144, discloses a method and apparatus for pretreatment of wastewater streams by chemical oxidation.

Recently, it has been proposed via commonly owned U.S. Pat. No. Re. 37,181 and Re. 36,651 (the entire content of each is expressly incorporated hereinto by reference) that the addition of nitrate, typically via an aqueous nitrate salt solution, to sewage systems, waste treatment plants and other industrial waste applications containing dissolved sulfides will result in the elimination or substantial reduction of the sulfides, as well as the elimination of other minor odors associated with other sulfur-containing compounds. It is also known that significantly raising the pH of water streams (i.e., to greater than 10) by addition of an alkaline material (i.e. sodium hydroxide, calcium hydroxide) causes significant reduction of biological activity that produces dissolved sulfide.

Unfortunately, this significant pH increase of wastewater can adversely affect operation of wastewater treatment plants. Alkali addition also causes a shift in the dissolved sulfide equilibrium, so that more of the volatile dissolved hydrogen sulfide ($H_2S$) is converted into nonvolatile sulfide ion ($S^{2-}$), thereby preventing release of hydrogen sulfide gas. However, hydrogen sulfide can still be stripped downstream (i.e. released to the atmosphere) as untreated additional flows become mixed with the alkaline treated wastewater, thereby reducing its pH, and nonvolatile sulfide ion is converted back to volatile dissolved hydrogen sulfide. As a result, operating a wastewater system at such a high pH level does not typically allow for satisfactory odor control on a continuous basis.

SUMMARY OF THE INVENTION

The invention can provide demand-based systems and techniques aimed at reducing, controlling, or inhibiting the formation, generation, accumulation, and/or realization of one or more odorous species, such as, but not limited to, sulfides, in a fluid to be treated such as water and/or wastewater streams or bodies of water and/or wastewater, or even atmospheres exposed thereto, based on a measured parameter of the water, wastewater, or atmosphere that provides an indication of a state thereof, such as an oxidation-reduction potential (ORP) value of the fluid to be treated, before, during, and/or after treatment thereof with one or more species or agents, or precursors thereof, promoting or inhibiting, directly or indirectly, the formation of the one or more odorous species.

In accordance with one or more embodiments, the invention provides a method of treating a water stream comprising acts of introducing a mixture consisting essentially of a nitrate species to the water stream at a first rate and introducing the mixture to the water stream at a second rate to provide a measured water stream target ORP value.

In accordance with one or more embodiments, the invention provides a method of treating a water stream comprising acts of measuring an ORP of the water stream and adjusting a rate of addition of a mixture based on the ORP measurement to control dissolved sulfide species in the water stream to a target value. The mixture consists essentially of a nitrate species.

In accordance with one or more embodiments, the invention provides a water treatment system. The water treatment system can comprise a nitrate source disposed to introduce a nitrate species to a water stream, a sensor disposed in the water stream and configured to transmit a signal corresponding to an ORP value of the water stream, and a controller disposed to receive the signal and configured to transmit a control signal to the nitrate source to adjust a rate of addition of the nitrate species introduced to the water stream to effect a target ORP value in the water stream.

In accordance with one or more embodiments, the invention provides a computer readable medium encoded with a program that, when executed on a processor of a computer, performs a method of treating a water stream, comprising acts of adding an alkaline material consisting essentially of an alkaline species to the water stream and adding a nitrate species to the water stream. A rate of addition of the alkaline material and a rate of addition of the nitrate species are sufficient to maintain a target ORP in the water stream.

In accordance with one or more embodiments, the invention provides a method of reducing a sulfide level in a water stream comprising acts of adding an alkaline species to the water stream and adding a nitrate species to the water stream. A rate of addition of the alkaline species and a rate of addition of the nitrate species is sufficient to maintain an ORP of the water stream at level of at least about −100 mV.

In accordance with one or more embodiments, the invention provides a method of treating a water stream consisting essentially of acts of adding a nitrate species to the water stream at a rate sufficient to maintain an ORP value of the water stream of at least about −100 mV and adding an alkaline species to raise a pH of the water stream by at least about 0.5 pH unit.

In accordance with one or more embodiments, the invention provides a method of treating a water stream comprising acts of adding a mixture consisting essentially of a nitrate species to the water stream, measuring an ORP of the water stream after adding the mixture, and adjusting a rate of addition of the mixture added to the water stream to reduce the ORP to a range of about −75 mV and about +75 mV.

In accordance with one or more embodiments, the invention provides a method of treating a water stream consisting essentially of introducing at a first position in the water system a mixture consisting essentially of a nitrate species at a rate that corresponds with a periodic demand defined by a schedule.

In accordance with one or more embodiments, the invention provides a computer readable medium encoded with a program that, when executed on a processor of a computer, performs a method of treating a water stream, comprising acts of introducing a mixture consisting essentially of a nitrate species to the water stream at a first rate and introducing the mixture to the water stream at a second rate to provide a measured water stream ORP value of at least about −100 mV.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DEFINITIONS

Figure 1:
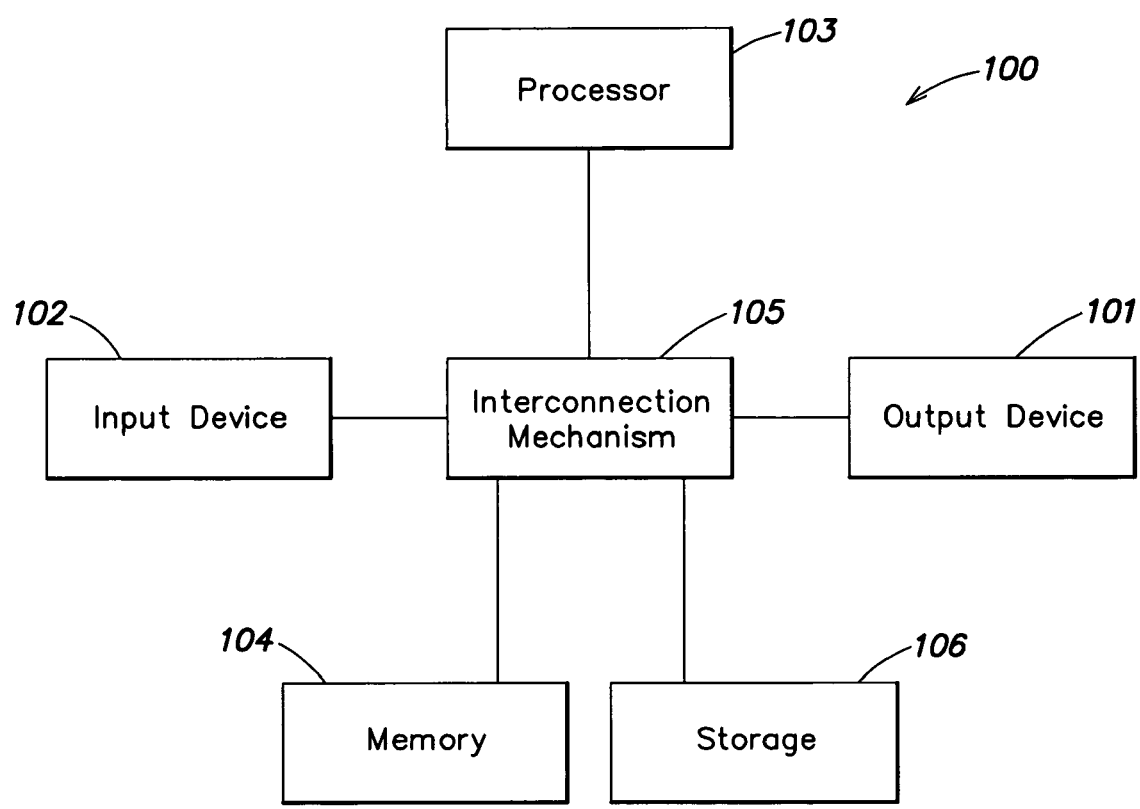
FIG. 1 illustrates a general purpose computer system upon which various embodiments of the invention may be practiced.

As used herein, "water" and "wastewater" refer to waters from municipal, oilfield and industrial operations which are susceptible to the generation of biogenic hydrogen sulfide due to the growth and activity of sulfate-reducing bacteria. They include, but are not limited to, streams resulting from municipal use, petroleum and natural gas production operations, seawater used in oilfield waterflood operations, effluent streams from chemical and biochemical processing and paper and pulp operations, bio-solid treatment applications, and water used in industrial heat transfer operations.

The terms "fluid to be treated," "fluid stream," "water stream," and "wastewater stream" are used to refer to a flow of a fluid, such as water or wastewater, typically through a conduit, or series and/or network of conduits that may be interconnected via one or more pumps or lift-stations.

The terms "treatment system" and "treatment facility" refer to any collection and/or treatment system or facility in which fluid is treated or processed to prevent, remove, or reduce undesirable constituents present therein. In some cases, the treatment system can comprise or form a portion of a fluid conveyance system, such as a sewer system.

The terms "feed point" and "point of introduction" refer to that vicinity, point, or location in the fluid stream where one or more compounds and/or treating agents such as, but not limited to, nitrate containing compounds or nitrate species, alkaline compounds or species, and/or polycyclic quinones, as well as precursors thereof, can be added or introduced into the fluid stream as well as to systems or subsystems utilized to effect introduction thereof.

The term "test point" refers to that vicinity, point, or location in the fluid stream wherein sensor data measurement (e.g., pH, dissolved sulfide concentration, atmospheric hydrogen sulfide concentration, residual nitrate concentration, ORP, etc.) is performed. The test point may be in the same general location as the feed point.

The terms "monitoring point" and "point of measurement" refer to that vicinity, point, or location in the fluid stream, typically downstream of the feed point, wherein sensor data measurement (e.g., pH, dissolved sulfide concentration, atmospheric hydrogen sulfide concentration, residual nitrate concentration, ORP, etc.) of a fluid stream is performed. The point of measurement can be a facility that can provide or result in exposure of a fluid stream and/or its associated atmosphere to the environment. The point of measurement can be displaced temporally and/or at a distance, for example, downstream, of a test point or a point of introduction. For example, the point of measurement can be a pumping station that can facilitate transport of a water stream in a sewer system, especially where ambient release of a gas, which may have been in chemical and/or thermodynamic equilibrium with the fluid stream, can occur and expose the environment to one or more odorous species.

The term "control point" refers to that point in the fluid stream, typically downstream of the feed point, wherein metrics (such as, for example, levels of atmospheric hydrogen sulfide, dissolved sulfide, ORP, and residual nitrate) for a treated fluid stream are established. Frequently, the control point may be at the same location as one of the monitoring points.

The term "point" is used in both a spatial sense and in a temporal sense. Specifically, for a fluid stream that flows along a distance, for example through a conduit, the term "point" refers to a location along that distance or conduit. For a fluid stream that is stored in a collection vessel, the term "point" is used in a temporal sense, such that two different points are spaced apart in time, but not necessary in space.

The term "detention time" refers to the amount of time between a feed point or point or introduction and a monitoring point or point of measurement, or where the fluid to be treated is stored in a collection vessel, the amount of time to turn over the volume of the vessel.

The terms "sulfide-inhibiting species" and "sulfide controlling compound" refer to compounds, or precursors thereof, that provide or result in an effect that reduce the concentration, inhibits, or prevents the biological formation, generation, accumulation, and/or realization of any sulfide compound or species, such as hydrogen sulfide. Typically, sulfide-inhibiting species and sulfide controlling compounds are treating species or agents that can effect such sulfide-generation inhibition effect by reducing the biological activity associated with sulfide species generation. Sulfide-inhibiting species and sulfide controlling compounds can also effect inhibition by promoting preferential biological conversion of nitrate compounds or species over sulfate species. Sulfide-inhibiting species can also react with one or more sulfide compounds or species thereby reducing the amount of such compounds.

As used herein, "plurality" means two or more. As used herein, whether in the written description or the claims, the terms "comprising," "including," "carrying," "having," "containing," "involving," and the like are to be understood to be open-ended, i.e., to mean "including but not limited to." Only the transitional phrases "consisting of" and "consisting essentially of," respectively, shall be closed or semi-closed transitional phrases, as set forth, with respect to the claims.

DETAILED DESCRIPTION

This invention is not limited in its application to the details of construction and the arrangement of components set forth in the following description or illustrated in the drawings. The invention is capable of other embodiments and of being practiced or of being carried out in various ways.

In accordance with one or more embodiments, the invention is directed to a method of treating water. Aspects of the invention can be used to provide a demand-based system and technique that utilizes one or more measurable parameters correlated to biological activity for, or in some cases instead of, one or more particular odorous species. Typically, the odorous species is a foul-smelling compound. The demand can be exhibited or represented by a parameter that represents a potential for formation, accumulation, and/or generation of the odorous species. For example, the demand-based or demand-responsive systems and techniques of the invention can be based on oxidation-reduction potential of the water.

In accordance with some embodiments, the systems and techniques of the invention can comprise or consist essentially of introducing at a first position in the water system a first mixture consisting essentially a nitrate species in an amount sufficient to raise an oxidation-reduction potential of the water stream to a target value, such as at least about −100 mV, at a second position downstream of the first position. In accordance with other embodiments, the invention can be directed to systems and techniques that comprise or consist essentially of introducing a material consisting essentially of a nitrate species to the water stream at a first rate and introducing the mixture to the water stream at a second rate that effects a target oxidation-reduction potential value in the water stream, which can be at least about −100 mV, or in a range from about −100 mV to about +100 mV. The invention can be further directed to a computer readable medium encoded with a program that, when executed on a processor of a computer, performs a method of treating a water stream. The method can comprise or consist essentially of introducing at a first position in the water system a first mixture consisting essentially a nitrate species in an amount sufficient to raise an oxidation-reduction potential of the water stream to a target or desired value at a second position downstream of the first position, which facilitates prevention or at least inhibition of release of malodorous species. In some aspects of the invention, the target or desired value can be at least about −100 mV. The invention is further directed to a program that performs a method that comprises or consists essentially of acts of introducing a material consisting essentially of a nitrate species to the water stream at a first rate and introducing the mixture to the water stream at a second rate that effects a measured oxidation-reduction potential value of at least about −100 mV of the water stream.

In some embodiments, the invention provides systems and techniques of reducing and/or inhibiting formation or accumulation of objectionable odorous species or compounds, in the fluid to be treated or in atmosphere exposed thereto, based on a change in a baseline characterization of the fluid. For example, the invention can provide systems and techniques of treating water or wastewater such that the concentration of sulfide species therein does not have associated hydrogen sulfide in a concentration that results in an objectionable odor condition. The systems and techniques of the invention can be implemented by characterizing a baseline or acceptable condition and adjusting an amount or a rate of addition of a treating agent based on a deviation from the baseline condition. A baseline condition can be considered as a nominal or normal operating condition of the water system. For example, a water system may have residual levels of a dissolved sulfide species in a water stream that do not form or provide hydrogen sulfide at an objectionable level. A relative change in measured ORP can initiate or adjust the amount added or rate of addition of one or more treating species or agent. The rate and/or amount of the one or more treating species or agent added can be further adjusted based on any one or more of the flow rate of the fluid to be treated, the temperature of the fluid to be treated, the pH of the fluid, the agitation of the fluid, or even prior monitored data (e.g. from prior periods of time). For example, where a cyclical temperature behavior is expected, the amount or rate of agent added can be adjusted based on the expected temperature, on a daily, monthly, or yearly cycle, as well as on the measured ORP.

Thus, in some cases, a change of about 50 mV in the measured ORP value of the fluid stream may warrant additional treating species or agent or a change in the rate of treating species added, which can be relative to a predetermined, scheduled amount prescribed or in anticipation of a typical normal treatment amount or rate of addition (e.g. a cyclical treatment schedule). The systems and techniques of the invention may be utilized to treat a fluid based on a baseline or background ORP value thereof and/or a change or deviation from the baseline measured ORP value of the fluid. Thus, in some cases, the systems and techniques of the invention can comprise adding an amount of a mixture comprising or consisting essentially of a nitrate species to a water or wastewater stream, measuring an ORP value of the water or wastewater stream before and/or after adding the mixture, and adjusting an amount or rate of addition of the mixture to the stream to maintain a change in the measured ORP value to less than a predetermined level relative to a typical, baseline, or expected ORP level. The change can be, for example, less than about 200 mV, in some instances, less than about 100 mV, in still other instances, less than about 50 mV. The change can also be controlled to be, for example, less than about 50%, in some cases, to less than about 25%, and in other cases, to less than about 10% of the difference between the ORP for the untreated water and the typical, baseline, expected, or anticipated ORP.

The treating species or agent added to the fluid to be treated is preferably added in an amount and/or at a rate that can inhibit and/or reduce the generation of one or more sulfide compounds or species, or react to reduce, at least partially, sulfide compounds or species concentration, manifested or measured as hydrogen sulfide or as dissolved sulfide. In some cases, the rate or the added amount of any one of a nitrate species, anthraquinone species, and/or alkaline species, or precursors, thereof is sufficient to maintain, and/or change a measured oxidation-reduction potential of the stream to a target, predetermined, or pre-selected value or range. For example, the target ORP value may be at least about −100 mV, at least about −100 mV, or even at least about 0 mV. In other cases, the target ORP value is defined in a range of about −75 mV to about +75 mV, in a range from about −50 mV to about +50 mV, or, in some cases, in a range from about −25 mV to about 0 mV. The target ORP value or range will typically vary based on several factors including, but not limited to, the composition of the fluid to be treated, the type and activity of the microorganism(s) present or absent therein, the pH and temperature of the stream or the degree of agitation that may be anticipated downstream, and may as well vary according to or in correspondence with a demand, which may be periodic and/or cyclic. In some cases, a fluid to be treated can have a variable treatment requirement, i.e., a varying demand requirement, that induces a corresponding variation in an amount or rate of addition of one or more treating species. Thus, the systems and techniques of the invention can be directed to varying demand requirements. The demand may have a predictable nature so that it increases and/or decreases at particular periods during a cycle. The cycle may be defined as a schedule that identifies or includes one or more periods of relatively increased demand, one or more periods of nominal or baseline demand, and/or one or more periods of relatively reduced demand. For example, a water system can have water to be treated that has a daily cycle such that an increased demand for a treating agent is expected during an evening period. The systems and techniques of the invention can be configured to anticipate and/or adjust to such an increased demand, with respect to the demand magnitude and/or duration. Thus, in accordance with one or more embodiments, the systems and techniques of the invention can introduce one or more treating species to a fluid to be treated based, at least partially, on a periodic demand defined by a schedule as well as based on a measured process parameter.

Moreover, the target value can be expressed in relative terms sufficient to provide an effective reduction, generation, or accumulation of the one or more sulfide species. For example, the effective amount can result in less than about 0.5 mg/L of dissolved sulfide species.

In accordance with one or more embodiments, the invention is directed to a treatment system having nitrate-reducing bacteria in a stream thereof. The water treatment system can comprise a treating species source disposed to introduce a treating agent, such as nitrate species, to the stream, a sensor disposed in the stream and configured to transmit a signal corresponding to an oxidation-reduction potential value of the stream, and a controller disposed to receive the signal and configured to transmit a control signal to the nitrate source to adjust an amount of the nitrate species introduced to the stream to effect an oxidation-reduction potential value of the stream of at least about −100 mV as measured, for example, at a downstream location from the point of introduction of the treating species. In some cases, the amount of nitrate species added is sufficient to control, remove, reduce, and/or inhibit sulfide species to below a level that will prevent generated accumulated atmospherically detectable hydrogen sulfide at given locations. For example, the amount of dissolved sulfide species is controlled, reduced, or inhibited such that an atmosphere exposed to, typically in equilibrium with, water having such dissolved sulfide species, has a hydrogen sulfide concentration that is not malodorous or has objectionable odor. Indeed, one or more aspects of the invention can provide systems and techniques that can reduce and/or maintain a sulfide concentration in water at a target value. Thus, for example, depending on several factors such as, but not limited to, the temperature and pH of the water as well as type of species, the amount of dissolved sulfide species in the water can be less than about 1 ppm and/or even less than about 0.5 ppm.

One or more aspects of the invention can be directed to defining or establishing a target value of a parameter. Thus for example, some embodiments of the invention can comprise acts or techniques that characterize a target ORP value that pertains to a desirable odor condition, such as an acceptable hydrogen sulfide concentration, a dissolved sulfide concentration in a water stream, and/or an acceptable nitrate species concentration in the water stream. Characterization of a target parameter value may be performed by, for example, trial and error techniques that introduces a known amount of one or more treating agents and measuring one or more measurable parameters of the water stream and collating a plurality of such sets of measurements to establish the acceptable value or acceptable range of the target parameter. For example, characterization of a particular facility may involve a plurality measurement sets including an amount or rate of nitrate added, a corresponding measured ORP value, and/or a measured concentration of dissolved sulfide species.

In some cases, the controller can be configured to maintain oxidation-reduction potential value of treated water in a range of about −75 mV to about +75 mV, or even in a range from about −25 mV to about +25 mV at, for example, a downstream location such as a location that can release or provide ambient exposure. The system can have a detention time that can correspond to a stream travel time between the treating species source location and a sensor location. The controller can also be configured to transmit the control signal based on an oxidation-reduction potential signal and the detention time.

In other cases, the treatment system can consist essentially of a nitrate source disposed to introduce a nitrate species to the fluid stream, an alkali source disposed to introduce an alkali species to the fluid stream, a pH sensor, typically disposed in the fluid stream, configured to measure a pH thereof and transmit a corresponding pH signal, an oxidation-reduction potential sensor, also typically disposed in the fluid stream, configured to measure an oxidation-reduction potential thereof and transmit a corresponding oxidation-reduction potential signal, and a controller, typically disposed to receive the pH and oxidation-reduction potential signals. The controller can be configured to transmit a first control signal to the nitrate source to adjust a rate or an amount of the nitrate species introduced to the fluid stream to maintain the oxidation-reduction potential value in the fluid stream at at least about −100 mV. The controller may also be configured to transmit a second control signal to the alkali source to raise the pH of the fluid stream by at least about 0.5 pH unit, or even at least about 1 pH unit.

The rate of addition and/or the amount of agent or species added can be adjusted continuously, instantaneously, or intermittently as necessary. For example, a water treatment system can introduce one or more sulfide-inhibiting or sulfide-reducing species, or precursors thereof, at a rate over a predetermined period of time. In other cases, the rate can be adjusted as necessary in response to a demand on the water system. The one or more sulfide-inhibiting species can be introduced at a uniform rate over a period of time such as, for example, twenty-four hours, but such rate can be modified in response to a control scheme over the next or a future predetermined period. In some cases, the rate can vary, cyclically or in an established rhythm or pattern and be further adjusted based on the measured parameter. Thus, for example, the one or more sulfide-inhibiting species, or precursors thereof, can be introduced at a new or adjusted rate during the next or a future twenty-four hour period that would have a typically cyclic pattern that has one or more peak rates through the twenty-four hour period.

Further, a treating species can be added at a first amount and/or at a first rate of addition and also can be added at a second amount and/or at a second rate of addition. The second amount or rate of addition can be effected or performed after a delay or expired period of time. The delay can last minutes, hours, days, weeks, months or, in some cases, years. Thus introduction of the treating species or agent at a second amount and/or rate need not be immediately performed following the actual, observed conditions.

In some cases, the rate of introduction of one or more treating agents, such as the sulfide-inhibiting species, can be adjusted based on a measured parameter of the fluid to be treated to achieve or maintain a particular concentration. For example, a target sulfide-inhibiting species concentration in the fluid to be treated can be prescribed and a rate of addition thereof can be adjusted to meet a particular target concentration in the fluid to be treated based on the flow rate of the fluid.

In other cases, a predictive algorithm can be utilized to define a rate of introduction and/or a target concentration to anticipate a demand of the one or more sulfide-inhibiting species based on, for example, the flow rate of the fluid to be treated, the system or fluid volume, the temperature, and/or the pH of the fluid. The predictive algorithm can utilize, for example, stored information, which can have a historical basis pertinent to particular facilities or to similar facilities, which provides a forecast of a propensity to generate one or more odorous species based on one or more measured parameters. The algorithm can further provide a recommended or target amount or rate of introduction of, for example, the sulfide-inhibiting species, or precursors thereof, to minimize, eliminate, or at least reduce any such propensities or react to reduce the concentration thereof.

Figure 3:
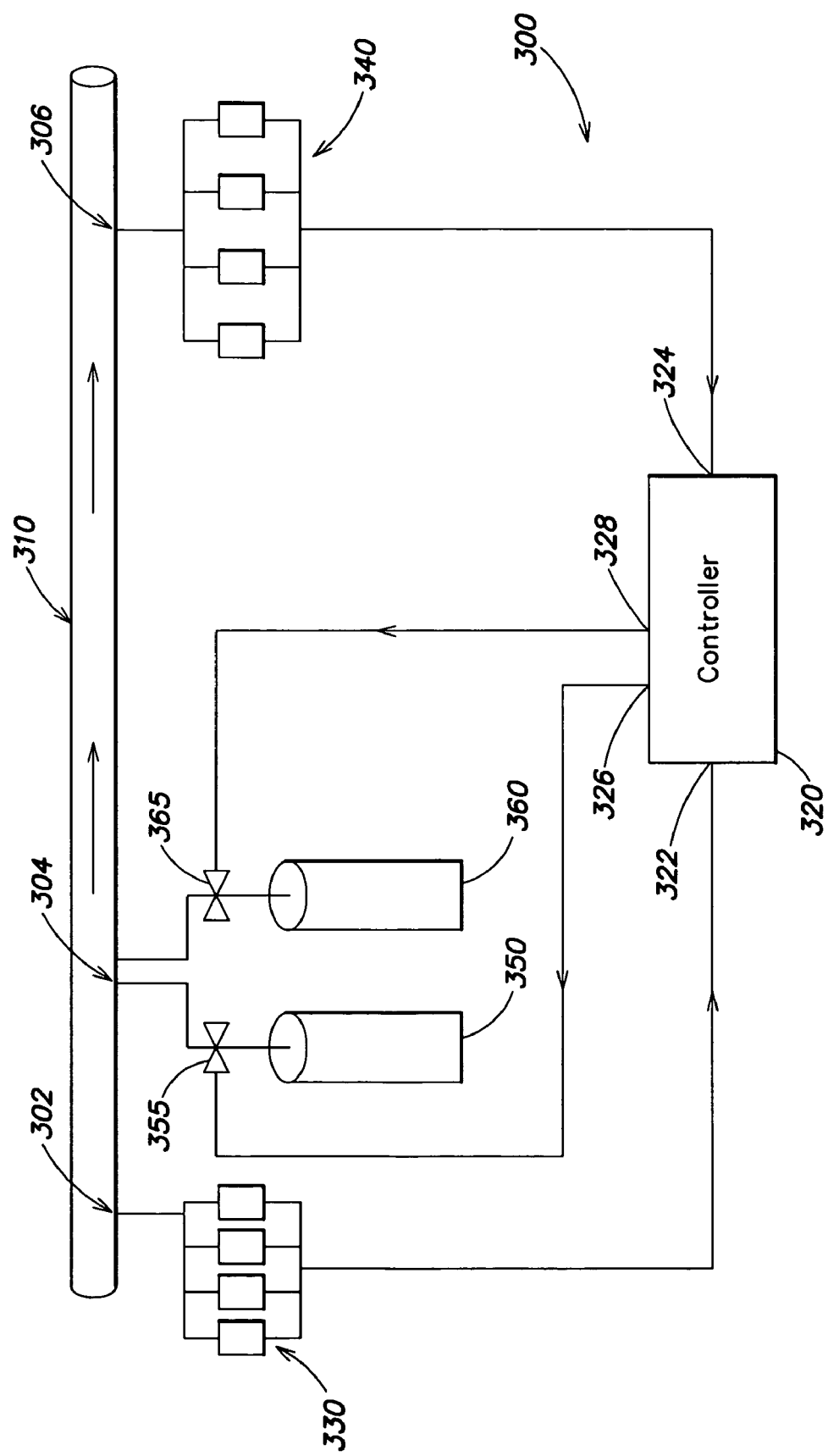
FIG. 3 illustrates a water treatment system according to one or more embodiments of the invention.

FIG. 3 illustrates an exemplary treatment system according to one or more embodiments of the invention. As shown, the treatment system 300 can include one or more pipes or conduits 310 through which a fluid stream, e.g. fluid to be treated, such as water or wastewater, can flow as shown in, for example, the conveyance direction indicated. One or, as shown, a plurality of upstream sensors 330 can be disposed in fluid communication with the incoming fluid stream at a test point 302, typically upstream of a feed point or point of introduction 304, wherein one or more sulfide-inhibiting species, such as a nitrate species, or precursors thereof, can be introduced. In some cases, additional sulfide-inhibiting species such as one or more alkaline species, or precursors thereof, and/or one or more anthraquinone species, or precursors, can also be introduced at one or more points of introduction 304. One or, as shown, a plurality of downstream sensors 340 are typically disposed in fluid communication with the fluid stream at one or more monitoring points or points of measurement 306, typically located downstream of the one or more feed points 304. In accordance with further embodiments, one or a plurality of sensors can be disposed in an atmosphere exposed to the fluid.

The plurality of upstream and/or downstream sensors 330, 340 are typically electrically connected to one or more controllers 320, that, dependent upon measurement signals provided by the sensors, adjusts the rate and/or amount of one or more sulfide-inhibiting species, e.g. nitrate species, alkaline species, and/or anthraquinone species, added to the incoming fluid stream at one or more points of introduction 304. For example, based upon parameters of the water stream as measured by one or more of the upstream and/or downstream sensors 330, 340, controller 320 can adjust the amount and/or rate of nitrate species, alkaline species, or both, added to fluid stream in conduit 310. In some cases, addition of one or more anthraquinone species or precursors thereof can also be controllably added to the fluid stream at the one or more points of introduction 304.

Although the plurality of upstream sensors 330 are exemplarily shown in FIG. 3 as being disposed at a distance upstream of the feed point 304, it should be appreciated that the invention is not so limited. For example, where access to the fluid stream is limited, the upstream sensors 330 may be physically disposed in the same general location as the feed point 304 wherein the sulfide-inhibiting species are introduced to the fluid stream. Moreover, it should be appreciated that one or more of the plurality of upstream sensors 330 may be located at a different position or vicinity in the fluid stream than the others. Similarly, although the downstream sensors 340 are shown as being disposed at a position well downstream of the feed point 304, the location of these sensors may vary dependent upon the accessibility of the fluid stream, as well as other factors such as, for example, the flow rate of the fluid stream and the level of sulfides, or other target species, present therein. Although only one monitoring point 306 is depicted in FIG. 3, it should be appreciated that one or more additional points of measurement may be utilized in accordance with the systems and techniques of the invention. For example, where a network of conduits convey the fluid to be treated, a plurality of points of measurements may be utilized.

The distance between the point of introduction 304 and the point of measurement 306 may be such that, at a particular flow rate of the fluid stream, a sufficient amount of time (e.g., detention time) is provided to enable microorganisms in the fluid stream to biochemically metabolize the nitrate species. This detention time may vary depending upon one or more factors such as, but not limited to, the level of sulfides present in the untreated fluid stream as well as the temperature and pH of the fluid to be treated or incoming stream. A detention time of at least 15 minutes; and, more preferably, at least 30 minutes; and, in some cases, at least one hour, or even at least about three hours can be sufficient to allow an appreciable reduction in the level of sulfides present in the fluid stream through, for example, the process of biochemical nitrate reduction. For example, a distance of approximately one mile between the feed point and the monitoring point can correspond to such a detention time that is sufficient to effect an appreciable or even a significant decrease in the level of atmospheric hydrogen sulfide and/or dissolved sulfides generated, accumulated, and/or realized at the monitoring point, which as described is typically disposed downstream of the feed point. In some cases, the detention time can be characterized as the realization time between a point of introduction and an available location that can result in a release of hydrogen sulfide. The releasing location can be, for example, a pumping or lift station that typically provides atmospheric or non-enclosed, open access that results in a release of hydrogen sulfide from the stream or a release of headspace vapor or atmosphere, typically having one or more accumulated odorous species, associated with the stream.

It should be appreciated that in some treatment systems, there may be no separation, in terms of physical distance, between the test point 302, the feed point 304, and the monitoring point 306. For example, in treatment systems wherein untreated water is stored in a collection vessel and then treated and released (e.g., bio-solid treatment applications), the test point 302, the feed point 304, and the monitoring point 306 may all coincide in space, but be separated in time. In such treatment systems, the upstream and downstream sensors may be the same physical sensors, but used to measure parameters of the fluid to be treated at different times, before and after the introduction of sulfide controlling and/or reducing compounds.

The plurality of upstream sensors 330 may include, for example, a sensor for measuring an oxidation-reduction potential of the fluid stream, a sensor for measuring the pH of the fluid stream, a sensor for measuring the level or concentration of liquid phase sulfide present in the fluid stream, a sensor for measuring the level or concentration of atmospheric hydrogen sulfide present in the fluid stream, or a combination of one or more such sensors. Additional upstream sensors may also be included such as, but not limited to, temperature sensors for measuring the temperature of the fluid stream, species-specific sensors for measuring a level or concentration of a specific species which can utilize amperometric and/or potentiometric techniques, as well as flow meters or sensors, e.g. transducers, for measuring the flow rate of the fluid stream. In some cases, upstream sensor 330 can comprise one or more systems that can analytically measure a composition of the fluid stream based on, for example, calorimetric or chromatographic techniques.

The plurality of downstream sensors 340 may likewise include sensors similar to those disposed at the test point 302. The one or plurality of downstream sensors 340 can include a sensor for measuring an oxidation-reduction potential of the stream, a sensor for measuring the level or concentration of liquid phase sulfide present in the treated stream, a sensor for measuring the level or concentration of atmospheric hydrogen sulfide present in the treated stream, and a sensor for measuring the amount of residual nitrate present in the treated stream. Additional sensors such as a pH sensor, a temperature sensor, or a combination of one or more such sensors may also be provided. In some cases, downstream sensor 340 can likewise comprise one or more systems that can analytically measure a composition of the stream based on, for example, calorimetric or chromatographic techniques.

Each of the plurality of upstream and downstream sensors 330, 340 can be coupled to or be in operative communication with controller 320, which may, for example, be a general purpose computer system, such as a personal computer or workstation. Signals from each of the plurality of upstream sensors 330 are typically received on an input 322 of the controller 320, and signals from each of the plurality of downstream sensors 340 are typically received on an input 324 of the controller 320. Based at least in part upon the signals received from the upstream and/or downstream sensors, the controller 320 can determine whether the current feed rate of alkaline species, anthraquinone species, and/or nitrate species is optimal, and if not, adjusts them accordingly.

Although the signals from the upstream and downstream sensors are exemplarily depicted in FIG. 3 as being provided to the controller 320 over a single line, it should be appreciated that the invention is not so limited. For example, rather than being multiplexed together in the manner depicted, the signals from each of the upstream and downstream sensors may alternatively be provided to the controller 320 over separate lines, one for each sensor for example, or may be transmitted wirelessly utilizing any suitable data transmission protocol. Further, where the signals provided by the upstream and/or downstream sensors are not in a form that can be directly utilized by the controller 320, appropriate signal conversion equipment (not shown) may be provided. As the details of communicating sensor signals to a controller are understood by those skilled in the art, further discussion of such details is omitted herein.

A source of nitrate species 350, or one or more precursors thereof, is typically fluidly connected to conduit 310 via, for example, a metering valve and/or pump 355, and a source of alkaline species 360, or one or more precursors thereof, can be typically fluidly connected to conduit 310 via, for example, a metering valve and/or pump 365. Optionally, a source of any one or more of an anthraquinone species, hydrogen peroxide, and a chlorite can be likewise fluidly connected to conduit 310 via a metering valve and/or pump. As described in further detail with respect to FIG. 4, based at least in part upon measurements provided by the upstream and/or downstream sensors 330, 340, each of the metering valves/pumps typically receives a control signal from controller 320 that determines the amount and/or rate of treating species such as nitrate species, alkaline species, and/or anthraquinone species, or precursors thereof, added to the stream in conduit 310. For example, metering valve and/or pump 355 can receive a control signal from output 326 of controller 320 and metering valve and/or pump 365 can receive a separate control signal from output 328 of controller 320.

According to one embodiment of the invention, and where the anthraquinone species, the nitrate species, and the alkaline species are provided from separate sources, the nitrate species preferably includes calcium nitrate and the alkaline species preferably include sodium hydroxide. Although other types of nitrate species such as potassium nitrate and sodium nitrate may alternatively be used, calcium nitrate typically can provide nearly 50% more active nitrate-based oxygen in solution (approximately 3.5 lbs/gallon) as sodium nitrate (approximately 2.4 lbs/gallon), thereby reducing associated transportation and storage costs. Similarly, although other types of alkaline species, for example, calcium hydroxide or potassium hydroxide may be used, sodium hydroxide solution may be preferred for the source of alkaline species, because it can be readily available and relatively cost effective.

The rate and/or relative amounts of the treating species or agent added to the fluid stream will typically vary depending upon parameters of the fluid stream such as, but not limited to, the temperature and/or pH thereof, and the levels of atmospheric hydrogen sulfide and dissolved sulfide present therein, and the desired metrics of the treated stream, e.g., the levels of atmospheric hydrogen sulfide and dissolved sulfide present in the treated stream at the control point, the point of measurement, and/or the test point. For some water and/or wastewater streams, a molar ratio of the amount of alkaline species relative to the amount of the nitrate species of between approximately 0.5 to 1 and approximately 2 to 1 can be sufficient to cost effectively substantially inhibit, reduce, or eliminate atmospheric hydrogen sulfide and dissolved sulfide concentration present in the stream with greater efficiency than with nitrate addition alone.

Because separate sources of nitrate species, alkaline species, etc. can be provided, treatment system 300 can be readily optimized to meet the treatment demands of the incoming fluid to be treated. For example, where parameters of the incoming fluid stream vary significantly during the day, the amount, the rate, and/or the timing of addition of the nitrate species, the anthraquinone species, and/or the alkaline species may be varied independently of one another to achieve desired levels of atmospheric hydrogen sulfide and liquid phase sulfide compounds in the treated fluid stream. Such a configurable system can be economically attractive for large treatment facilities, where the associated raw materials costs can be a substantial portion of the system operating costs.

The treatment system is illustrated as having separate sources for each of the nitrate species and alkaline species. However, the treatment system can include a single source of sulfide-inhibiting species that, according to an embodiment of the invention, can include a mixture of nitrate species, anthraquinone species, and/or alkaline species, or precursors thereof, mixed together as well as other species such as hydrogen peroxide or even chlorites or other treating species. Such a treatment system may be advantageously suitable for smaller treatment facilities, wherein the associated raw materials costs are less significant, or where separate storage facilities are logistically inconvenient.

According to one or more embodiments of the invention, for example where the nitrate species and the alkaline species are mixed together and provided from a combined source, the nitrate species can comprise sodium nitrate and the alkaline species can comprise or consist essentially of sodium hydroxide. Although other types of nitrate species such as potassium nitrate and calcium nitrate may alternatively be used, sodium nitrate may be preferable because it is typically stable in solution having a temperature to approximately 22° F. (about −5.6° C.) when mixed with an about 50% caustic solution of alkaline species and water. Although other types of alkaline species may be used, sodium hydroxide is preferred as a source of alkaline species because it is typically readily available and cost effective.

In some cases, because the treatment systems of the invention can utilize a combined source of nitrate species and alkaline species, it can be suited or adapted to some water treatment facilities where the costs of raw materials (e.g., nitrate species and alkaline species) do not constitute an appreciable portion of the operating costs. However, it may be appreciated that the treatment system may also be used in other facilities where a less complicated configuration is preferred, where the parameters of the fluid stream do not vary significantly, or where a single source of sulfide-inhibiting species is either preferred or required including, for example, retrofitting an existing water treatment system. Thus, an existing system may introduce one or more odor controlling species or agents manually; may utilize one pump that delivers a continuous or adjustable amount, or deliver at a continuous or variable rate, of the treating species or agent; may utilize a plurality of pumps, wherein a first pump can introduce a constant amount or at a constant rate and a second or a plurality of pumps can introduce a variable amounts, or at variable rates, of the treating species or agent, or may utilize one or more variable rate pumps can be modified to adapt the systems and techniques of the invention.

Treatment system 300 can include one or more controllers 320 that typically receive one or more control signals from the upstream and downstream sensors, and based at least in part upon those signals, can adjust the rate and/or amount of sulfide-inhibiting species added to the stream to be treated. As should be appreciated by those skilled in the art, information other than the control signals received from the upstream and downstream sensors may affect the operation of controller 320. For example, parameters of an incoming fluid to be treated, such as, for example, the oxidation-reduction potential, the flow rate, the pH, the level of atmospheric hydrogen sulfide, and the level of dissolved sulfide of an incoming water stream can vary in a cyclical manner (e.g., by day of the week, by time of day, etc.), such that historical data reflecting parameters of the incoming stream may be used by the controller to predict future parameters. Accordingly, although the operation of the controller is described with respect to control signals received from the upstream and downstream sensors, it should be appreciated that other information may be considered. For example, where a system exhibits cyclical loading or odorous species generation, an additional amount of treating species or agent, or precursors thereof, can be added to anticipate the additional expected, cyclical loads.

According to one or more embodiments of the invention, controller 320 may be implemented using one or more computer systems. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC). One example of a general purpose computer system 100 on which the controller 320 may be implemented is now described with respect to the system exemplarily shown in FIG. 1.

Computer system 100 can include one or more processors 103 typically connected to one or more memory devices 104, which can comprise, for example, a disk drive memory, a flash memory device, a RAM memory device, or other device for storing data. Memory 104 is typically used for storing programs and data during operation of the computer system 100. For example, memory 104 may be used for storing historical data relating to the parameters of the incoming stream over a period of time, as well as current sensor measurement data. Software, including programming code that implements embodiments of the invention, is typically stored on a computer readable and/or writeable nonvolatile recording medium (discussed further with respect to FIG. 2), and then typically copied into memory 104 wherein it is then executed by the processor 103. Such programming code may be written in any of a plurality of programming languages, for example, Java, Visual Basic, C, C#, or C++, Fortran, Pascal, Eiffel, Basic, COBAL, or any combinations thereof.

Components of computer system 100 may be coupled by an interconnection mechanism 105, which may include one or more busses (e.g., between components that are integrated within a same machine) and/or a network (e.g., between components that reside on separate discrete machines). The interconnection mechanism typically enables communications (e.g., data, instructions) to be exchanged between components of system 100.

Computer system 100 can also include one or more input devices 102, for example, a keyboard, mouse, trackball, microphone, touch screen, and one or more output devices 101, for example, a printing device, display screen, or speaker. In addition, computer system 100 may contain one or more interfaces (not shown) that can connect computer system 100 to a communication network (in addition or as an alternative to the network that may be formed by one or more of the components of system 100).

According to one embodiment of the invention, the one or more input devices 102 may include the sensors for measuring parameters of the incoming and treated fluid streams (i.e., the upstream and downstream sensors), and the one or more output devices 101 may include the metering valves and/or pumps. Alternatively, the upstream sensors, the downstream sensors, the metering valves and/or pumps, or all of these components may be connected to a communication network that is operatively coupled to computer system 100. For example, upstream sensors 330 may be configured as input devices that are directly connected to computer system 100, metering valves and/or pumps 355 and/or 365 may be configured as output devices that are connected to computer system 100, and the plurality of downstream sensors may be coupled to another computer system or component so as to communicate with computer system 100 over a communication network. Such a configuration permits the downstream sensors to be located at a significant distance from the upstream sensors, while still providing sensor data to the computer system 100.

Figure 2:
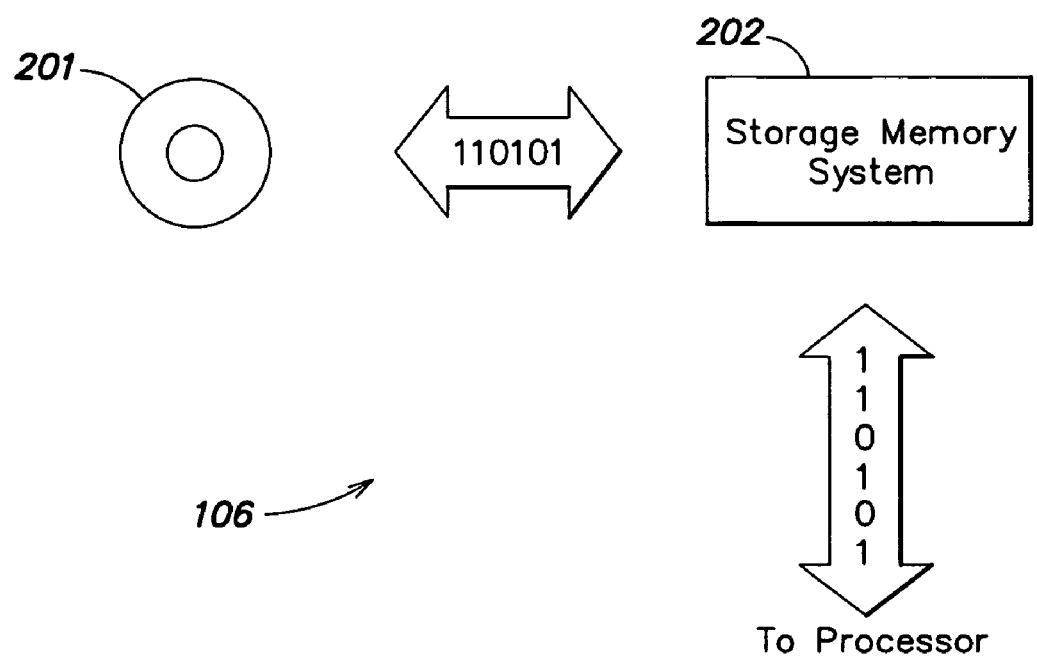
FIG. 2 illustrates a storage system that may be used with the computer system of FIG. 1.

Storage system 106, shown in greater detail in FIG. 2, typically includes one or more computer readable and/or writeable nonvolatile recording medium 201 in which signals can be stored that define a program to be executed by the one or more processors 103. The medium may, for example, be a disk or flash memory. Typically, in operation, processor 103 causes data, such as code that implements embodiments of the invention, to be read from the nonvolatile recording medium 201 into another memory 202 that allows for faster access to the information by the processor than does the medium 201. Memory 202 is typically a volatile, random access memory such as a dynamic random access memory (DRAM) or static memory (SRAM), and may be located in storage system 106, as shown, or in memory system 104, not shown.

Although computer system 100 is shown by way of example as one type of computer system upon which various aspects of the invention may be practiced, it should be appreciated that the invention is not limited to being implemented in software, or on the computer system as exemplarily shown. Indeed, rather than being implemented on a general purpose computer system, the controller may alternatively be implemented as a dedicated system or as a dedicated programmable logic controller (PLC). Further, it should be appreciated that aspects of the invention may be implemented in software, hardware or firmware, or any combination thereof.

Figure 4:
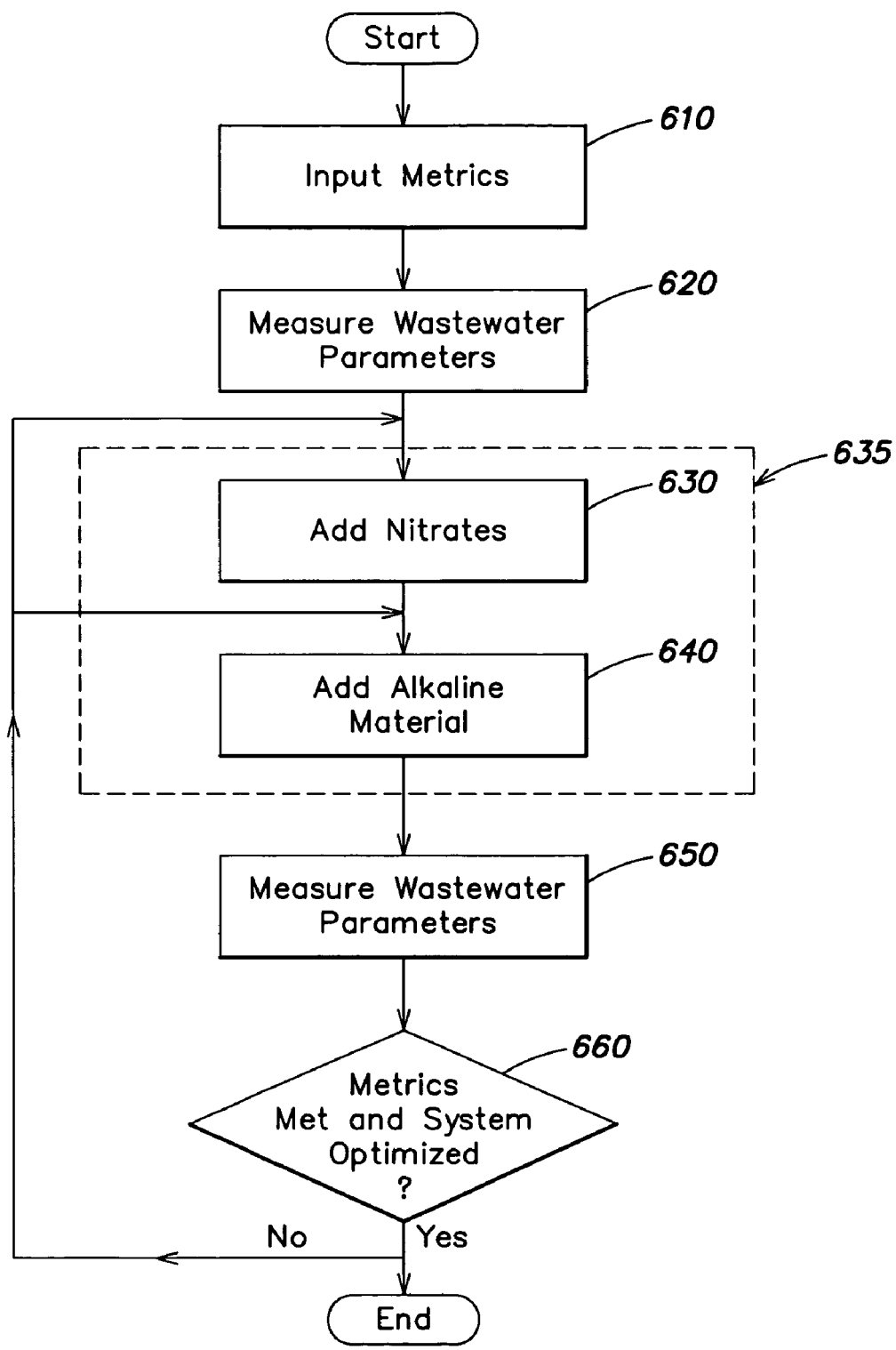
FIG. 4 is a flow chart illustrating a process for the treatment of water or wastewater according to one or more embodiments of the invention.

FIG. 4 is a flowchart that depicts the operation of a water treatment system 300 according to one or more illustrative embodiments of the invention. Although the operation of the treatment system is described primarily with respect to a water treatment method or routine that may be executed by a controller (e.g., controller 320 of FIG. 3), it should be appreciated that the invention is not so limited, and many of the steps described below may be implemented manually or batch-wise, for example, by a person, rather than by a controller, as discussed in more detail further below.

At step 610, a user is typically requested to input metrics pertaining to the quality of the treated stream. For example, the user may be prompted to enter maximum and/or minimum allowed values for the oxidation-reduction potential of the treated water stream or the concentration of dissolved sulfides and atmospheric hydrogen sulfide in the treated water stream. Where there are mandated municipal, state, or federal requirements for the treated water stream, or where there are safety and/or environmental requirements or guidelines pertaining to such streams, the user may enter those values or parameters. It should be appreciated that other parameters may be entered at step 610 such as, but not limited to, the maximum and/or minimum pH of the treated water stream and/or the estimated flow rate of the water stream, as the invention is not limited to a particular set of metrics. Moreover, physical parameters of the water stream that may impact the treatment thereof, such as the detention time, or the distance between the feed point and the monitoring point may also be entered. Thereafter, the routine optionally proceeds to step 620.

At step 620, the treatment routine can measure various parameters of the incoming water stream, as determined by one or more of the plurality of upstream sensors 330. For example, parameters of the incoming water stream that may be measured at step 620 may include the temperature, the oxidation-reduction potential, the pH, and the concentration of dissolved sulfide and/or atmospheric hydrogen sulfide present therein, or any combination of these parameters. Other parameters that may be measured at step 620 may include, for example, the flow rate of the incoming water stream. The measured parameters of the incoming water stream may be temporarily stored, e.g. in a volatile memory of the controller (e.g., RAM), and/or stored in a more permanent form of memory of the controller (e.g., storage system 106 in FIG. 2), for example, to use as historical data for effecting operation of the controller, as discussed more fully below.

After acquiring parameters of the incoming water stream, the routine proceeds to step 630, wherein the routine determines an amount or rate of addition of, for example, a first treating species such as a nitrate, or precursors thereof, to be added to the incoming water stream, and then typically adds that determined amount or adjusts the rate of addition to the determined rate. The rate or amount of nitrate species added at step 630 may be determined, as an independent or dependent function, for example, such as a rate in gallons per day, or as a percentage of the water stream flow. After determining the amount of nitrate species to be added to the water stream, the routine typically configures the metering valve and/or pump to provide the determined amount of nitrate species to the water stream.

At step 640, the routine can determine a rate or an amount of, for example, a second treating species, such as an alkaline species, or precursors thereof, to be added to the incoming water stream, and then adds at that determined rate or the determined amount of second treating species thereto. The rate or amount of alkaline species added at step 640 may be determined as an independent or dependent function, for example, as a rate in gallons per day, or as a percentage of the water stream flow. This determination may be based upon either the estimated flow rate, for example, as input at step 610, or the actual flow rate as measured, for example, in step 620.

Likewise, the routine can determine a rate and/or an amount of a third treating species, such as an anthraquinone species or precursors thereof, to be added to the incoming water stream. The amount of third treating species or its precursor added may again be determined as an independent or dependent function, for example, as a rate in gallons per day, or as a percentage of the water stream flow rate.

Although the invention is not limited to a particular value or range of values of pH for the treated water stream, the amount of alkaline species, if added, is preferably sufficient to raise the pH of the water stream by approximately 0.5 pH unit or, in some cases, by about 1 pH unit, assuming a typical pH of the incoming water stream of between about 6.5 and about 7.5 pH units. Alternatively, the pH of the water stream can be measured and the amount of alkaline species added can be adjusted based on the measured value to effect and/or maintain, for example, a pH increase of at least about 0.5 pH unit or even at least about 1 pH unit relative to the pH at the point of measurement, the point of introduction, or the test point. Where the incoming flow of water is unusually high or low, the amount of alkaline species added may be such that the pH of the treated water stream is between about 7 and about 9 pH units, and more preferably, between about 7.5 and about 8.5 pH units. After determining the amount of alkaline species to be added to the water stream, the routine then configures the metering valve and/or pump to provide the determined amount of alkaline species to the water stream by, for example, transmitting an output or drive signal thereto.

Where the treatment system does not include separate source of nitrate species, anthraquinone species, or alkaline species, it should be appreciated that a single combined step may be utilized wherein an amount of a mixture of nitrate species, anthraquinone species, and/or alkaline species, or precursors thereof, is determined and added to the water stream. For example, the mixture may contain equal volumes of a nitrate species, such as sodium nitrate at any suitable concentration or ratio such as, approximately 3.1 lbs nitrate/gallon of solution and a 20%, a 25%, or a 50% caustic solution of sodium hydroxide. The amount of the mixture added may be initially based upon the amount of nitrate species to be added, or the amount of alkaline species to be added, as one will typically necessarily determine the other. After determining the amount of the mixture to be added, the routine can then configure the metering valve and/or pump to provide the determined amount of the mixture to the water stream.

After either of steps 630 or 640, or both, the water treatment routine typically proceeds to step 650, wherein various parameters of the treated water stream are measured, as determined by, for example, one or more of downstream sensors 340. For example, parameters of the treated water stream that may be measured at step 650 can include the concentration or level of atmospheric hydrogen sulfide present in the treated water stream, the oxidation-reduction potential of the treated water stream, and the concentration or level of dissolved sulfide present in the treated water stream. Other parameters such as pH and the concentration or level of residual nitrates present in the treated water stream may also be measured. It should be appreciated that where separate sources of nitrate species and alkaline species are used, measurement of the pH of the treated water stream and the concentration or level of residual nitrates present in the water stream may allow the amounts of nitrate species and alkaline species to be separately, individually varied and optimized, dependent upon the measured values.

After measuring parameters of the treated water stream, the routine can proceed to step 660, wherein a determination is typically made as to whether the desired metrics of the treated water stream have been met, and/or whether the system is optimized. It should be appreciated that the determination as to whether the desired metrics of the treated water stream have been met and/or whether the system is optimized may depend on the location of downstream sensors 340. For example, where downstream sensors 340 are disposed at the control point, this determination may be made by a comparison of the parameters measured at step 650 and the desired metrics for the treated water stream.

Alternatively, where the downstream sensors are disposed at a significant distance upstream of the control point, this determination may be more complex. For example, where the downstream sensors are disposed at a significant distance upstream of the control point, further biological activity may be expected to occur, such that the levels of oxidation-reduction potential of the water stream and/or atmospheric hydrogen sulfide and dissolved sulfide at the control point may be greater, or in some cases lesser, than those at the monitoring point wherein the parameters of the treated water stream are measured at step 650. In such case, the parameters measured at step 650 may be adjusted (e.g., upward) to reflect values that would be expected at the control point and then compared to the desired metrics, or alternatively, the desired metrics at the control point may be adjusted (e.g., downward) to reflect values that would be expected at the monitoring point. Although the invention is not so limited, it is preferred that downstream sensors 340 be disposed at the control point, as the determination made at step 660 is thereby made considerably more precise and less complex.

When it is determined at step 660 that the metrics for the treated water stream have been met and the system is optimized, the routine can terminate. Alternatively, when it is determined that the metrics for the treated water stream have not been met, or that the system is not optimized, the routine can be directed to return to step 630 (e.g. for a treatment system that includes separate sources of sulfide inhibition species), or step 635 (e.g. for a treatment system that includes a combined source of sulfide-inhibiting species), wherein the amounts of nitrate species, second treating species, and/or third treating species, or the amount of nitrate species, second treating species, and third treating species are adjusted as dependent on one or more of the measured parameters measured at, for example, step 650. It should be appreciated that dependent upon whether the treatment system includes separate sources, or a combined source of sulfide-inhibiting species, the operation of the system may vary.

The respective amounts of sulfide-inhibiting species added to the incoming water stream may be independently adjusted to meet required metrics for the treated water stream in an economically efficient manner. For example, when it is determined at step 660 that metrics for the levels of oxidation-reduction potential and/or dissolved sulfide and atmospheric hydrogen sulfide are met, but appreciable levels of residual nitrate are present in the treated water stream, the amount of the sulfide-inhibiting species, e.g. nitrate species, added may be reduced to further optimize the system. It should be appreciated that the presence of appreciable levels of residual nitrates in the treated water stream may indicate that the amount or rate of addition of nitrate species added may be reduced while meeting the desired metrics. Of course, as noted previously, whether appreciable levels of residual nitrate species are present may depend on the position of the sensor used to measure this parameter. For example, where the sensor used to measure levels of residual nitrate species concentration is disposed at the control point, an average level of residual nitrate greater than about 1 or even about 2 mg/L or a peak level of residual nitrate greater than approximately 5 mg/L may indicate that the rate and/or amount of nitrate species added may be reduced. Dependent upon the pH of the treated water stream, the amount of alkaline species added may also be reduced or increased. Likewise, dependent upon the measured concentration of the anthraquinone species or the measured concentration of a proxy for the activity of the anthraquinone species, the amount of the anthraquinone species, or a precursor thereof, may be increased or decreased to accordingly achieve a target, predetermined, or pre-selected value or range. After modifying the respective or collective rate or amounts of sulfide-inhibiting species added, the routine can be directed to return to steps 650 and 660.

Alternatively, when it is determined that the desired metrics for the levels, such as the oxidation-reduction potential and/or dissolved sulfide and atmospheric hydrogen sulfide are not met, but little or no residual nitrate is measured in the treated water stream and/or the oxidation-reduction potential is below an desirable range, the amount of the individual or collective sulfide-inhibiting species, e.g. the nitrate species, added may be increased to further optimize the system. For example, dependent upon the pH of the treated water stream, the amount of alkaline species added may also be increased. After modifying the rate and/or amounts of sulfide-inhibiting species, e.g. nitrate species and/or alkaline species, added, the routine returns to steps 650 and 660. Anthraquinone species may also be added if the measured sulfide species concentration remains above a desired level.

Where metrics for dissolved sulfide are met, but metrics for atmospheric hydrogen sulfide are not, and appreciable levels of residual nitrate are measured in the treated water stream (e.g., an average level above about 1 or about 2 mg/L, or a peak level above approximately 5 mg/L, as measured at the control point), the amount of alkaline species added may be increased to shift the $H_2S/HS^-$ equilibrium point to favor $HS^-$, thereby also further increasing the reduction of the residual nitrates by bacteria in the water stream, and further optimizing the system. Alternatively, where metrics for atmospheric hydrogen sulfide are met, and those for dissolved sulfide are not, and appreciable levels of residual nitrate are measured in the treated water stream, the amount of alkaline species added may be decreased to shift the $H_2S/HS^-$ equilibrium point to favor atmospheric hydrogen sulfide, thereby reducing the level of dissolved sulfide. After modifying the rate and/or amount alkaline species added to either increase or decrease the amount of alkaline species added to the water stream, the routine typically returns to steps 650 and 660.

Adjustment of the individual or collective amounts of the added sulfide-inhibiting species may be performed in steps or increments or may be performed utilizing any suitable control algorithm such as but not limited to those employing proportional, integral, and/or derivative based techniques. Other techniques that may be utilized include, for example, on/off control and time-based or variable on/off control. Further, the control loops or algorithms may be configured to utilize nesting techniques. For example, adjustment of the added amounts may be dependent on, as a primary parameter, the measured oxidation-reduction potential and on, as a secondary parameter, the measured pH and/or the measured temperature of the stream. In other cases, several ORP values can be utilized in such techniques or in separately operating systems.

The embodiments utilizing feedback control can adjust the rate and/or amount of sulfide-inhibiting species added to the incoming water stream, based upon measured parameters of the treated fluid stream. Accordingly, even if the initial rates or amounts of sulfide-inhibiting species added to the incoming water stream are not optimal, the system can readily adjust to optimal values over time. Further, due to this type of feedback control, the system can respond to changes in the incoming water stream. A feedforward based system could alternatively be utilized in the accordance with the techniques of the invention.

Although several of the steps or acts described herein have been described in relation to being implemented on a computer system or stored on a computer-readable medium, it should be appreciated that the invention is not so limited. Indeed, any one or more of the steps or acts may be implemented by, for example, an operator, without use of an automated system or computer. For example, the measuring of the parameters of the incoming and treated water streams may be performed by a human operator, and based upon those parameters, that operator, or another operator may manually adjust amounts of the sulfide-inhibiting species added to the incoming water stream. Moreover, the determination made at step 660 may be performed by a person, perhaps with the aid of a simple flow chart. Accordingly, although the water treatment routine was described primarily with respect to being implemented on a computer, it should be appreciated that the invention is not so limited.

It should be appreciated that numerous alterations, modifications, and improvements may be made to the illustrated treatment system. For example, as discussed above, the parameters of an incoming fluid stream, such as, but not limited to, the flow rate of an incoming water stream, the oxidation-reduction potential, temperature, and pH of the incoming water stream, as well as the levels of atmospheric hydrogen sulfide and dissolved sulfide present in the incoming water stream frequently vary in a cyclical manner (e.g., by day of the week, by time of day, etc.). Such historical data reflecting parameters of the incoming water stream may be used by the controller to predict parameters of the incoming water stream at a future time, and adjust the rate and/or amount of nitrate species, the rate and/or amount of second treating species, or even the rate and/or amount of the mixture of nitrate species and second treating species added to the incoming water stream in dependence thereon. For example, if past historical data indicates that the oxidation-reduction potential, the pH, and/or the flow of the incoming water stream varies in a cyclic manner, or if the levels of atmospheric hydrogen sulfide or dissolved sulfide vary in a cyclic manner, the rate and/or amount, individually or collectively, of the sulfide-inhibiting species may be varied in anticipation thereof.

Further, it should be appreciated that the operation of the controller may vary depending upon the placement of the upstream sensors 330, and/or the downstream sensors 340 relative to the control point. For example, where the downstream sensors are disposed at the control point and it is determined that the levels of atmospheric hydrogen sulfide and/or dissolved sulfide exceed the desired metrics, it may be too late to change the feed rate and/or amount of sulfide-inhibiting species. Where this is the case, the controller may be modified to respond to changes in the measured parameters of the incoming fluid stream.

Although the embodiments exemplarily shown or presented herein have been described as using a plurality of upstream and downstream sensors, it should be appreciated that the invention is not so limited. For example, rather than requiring any electronic or electro-mechanical sensors, the measurement of levels of atmospheric hydrogen sulfide and dissolved sulfide species present in the incoming and/or treated water streams could alternatively be based upon the olfactory senses of an operator or manually gathered data. As known to those skilled in the art, humans can be capable of detecting levels of atmospheric hydrogen sulfide in excess of 50 parts per billion, thus a human operator could be instructed to adjust the rate and/or amount of sulfide-inhibiting species added to the incoming water stream depending upon whether atmospheric hydrogen sulfide odor was noticeable or not.

EXAMPLES

In the examples, a wastewater stream was treated at an upstream location by introducing an amount of a nitrate species and/or a nitrate species source along with an alkali species source (BIOXIDE® nitrate oxygen species, available from USFilter Corporation, Warrendale, Pa.). An oxidation-reduction potential value of the stream was measured at a downstream location. Concentrations of dissolved sulfide species and residual nitrate species in the stream were measured, along with the pH of the stream and an associated atmospheric hydrogen sulfide, at a point of measurement, downstream of the point of introduction.

Oxidation-reduction potential of the stream was measured utilizing a model 67500B Redox ORP/Ref electrode connected to a model 407227 pH/mV temperature meter, both available from EXTECH Instruments Corporation, Waltham, Mass. Nitrate species concentration was determined by utilizing Nitrogen-Nitrate/Nitrite Test Strips, catalog number 27454-25, from Hach Company, Loveland, Colo. Dissolved sulfide concentration at less than about 10 mg/L was determined by utilizing a model 4630 CC-PS sulfide test kit, available from LaMotte Company, Chestertown, Md. Dissolved sulfide concentration at greater than about 10 mg/L was determined by utilizing number 211 sulfide detector tubes, available from GASTEC Corporation, Kanagawa, Japan.

Example 1

Figure 5A:
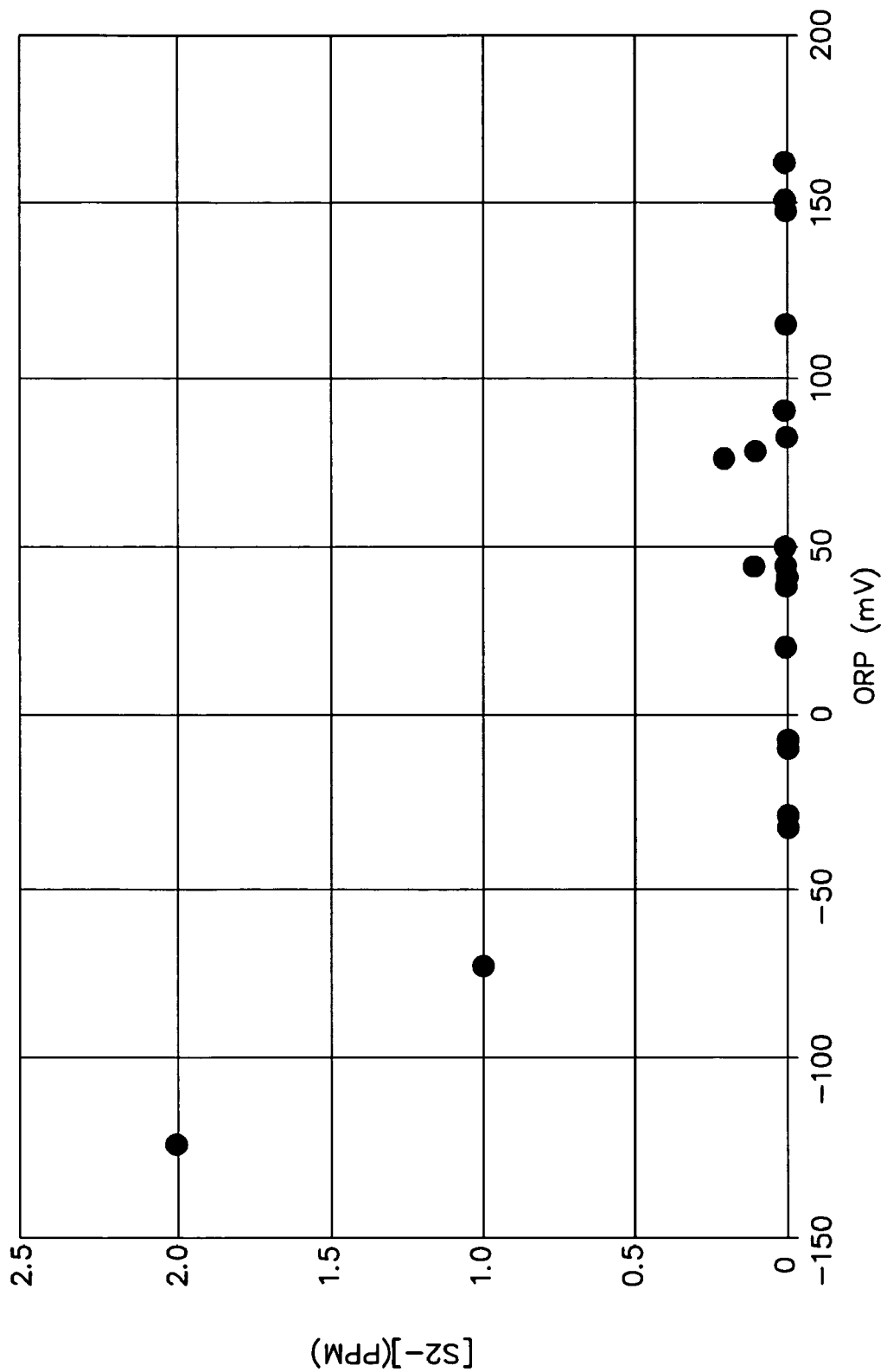
FIGS. 5A and 5B are graphs showing measured dissolved sulfide concentration (FIG. 5A) and measured nitrate concentration (FIG. 5B) relative to measured oxidation-reduction potential of water in a sewer system treated in accordance with one or more embodiments of the invention.

The concentration of dissolved sulfide and the ORP of water in a sewer system with an about 8-inch diameter pipe, under varying degrees of BIOXIDE treating agent dose was measured and that data is graphically presented in FIG. 5A. In FIG. 5A, the measured concentrations of dissolved or aqueous sulfide species ($S^{2-}$, in ppm), and the corresponding measured oxidation-reduction potential (ORP, in mV), are shown.

The separation distance between the point of introduction of the treating agent and the point of measurement, a manhole in this case, was about 2,275 feet. The average daily flow rate was about 0.1 MGD with a corresponding average detention time of about 1.42 hours.

The results presented in FIG. 5A show that when ORP is maintained at greater than about −50 mV, the concentration of dissolved sulfide species can be effectively reduced to trace levels.

Figure 5B:
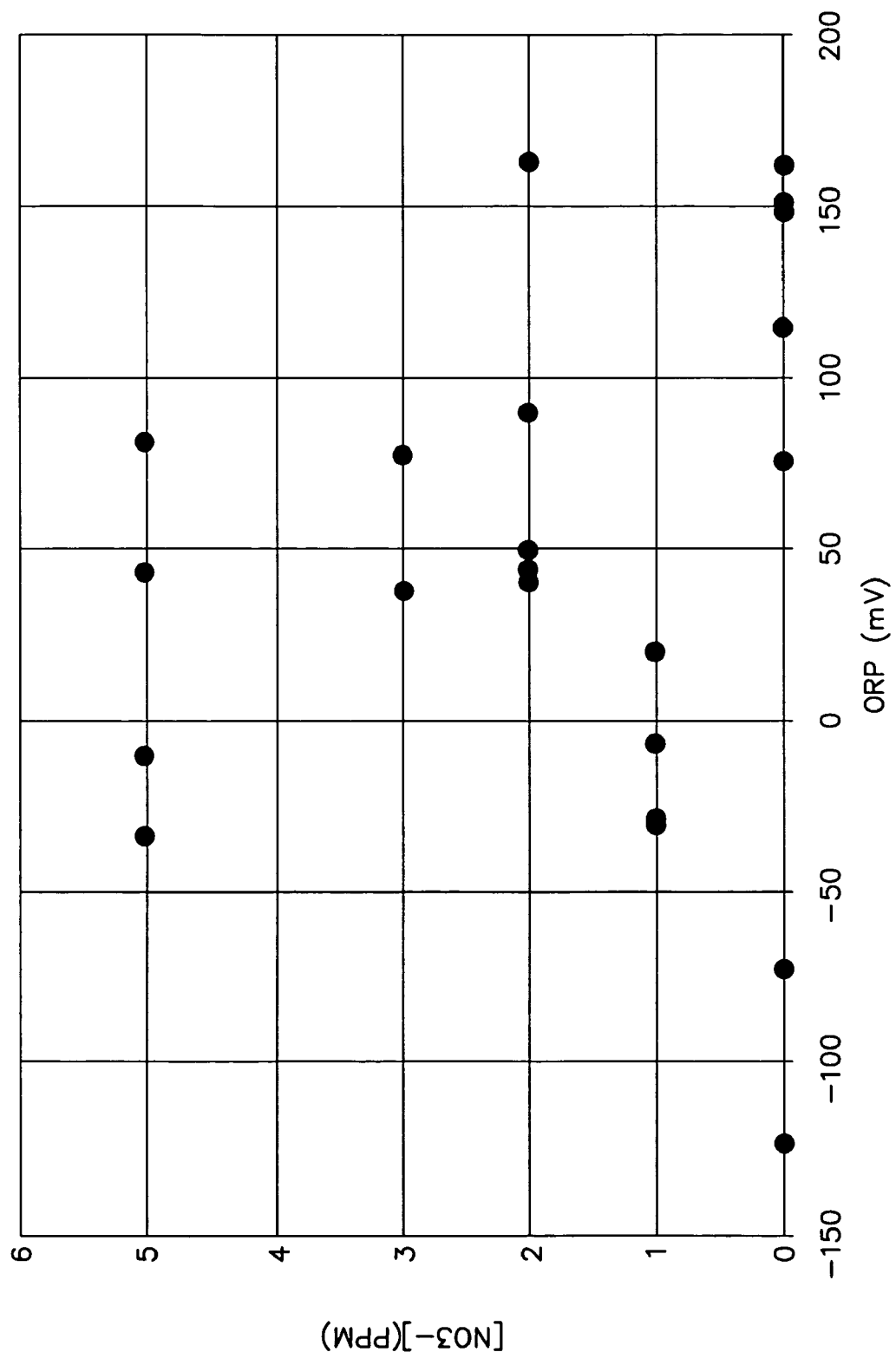

FIG. 5B shows the measured concentration of nitrate species for the same sewer section. In FIG. 5B, the concentration of nitrate species, in ppm, increases when the ORP is greater than about −50 mV.

Example 2

In another sewer system, the concentrations of dissolved sulfide and nitrate species (in ppm) were measured relative to the measured ORP (in mV). The measured data are presented FIGS. 6A and 6B.

The sewer system in this example utilized an approximately 14-inch diameter pipe having a line length of about 3,331 feet with an average daily flow rate of about 1.2 MGD, and a corresponding average detention time of approximately 32 minutes.

Figure 6A:
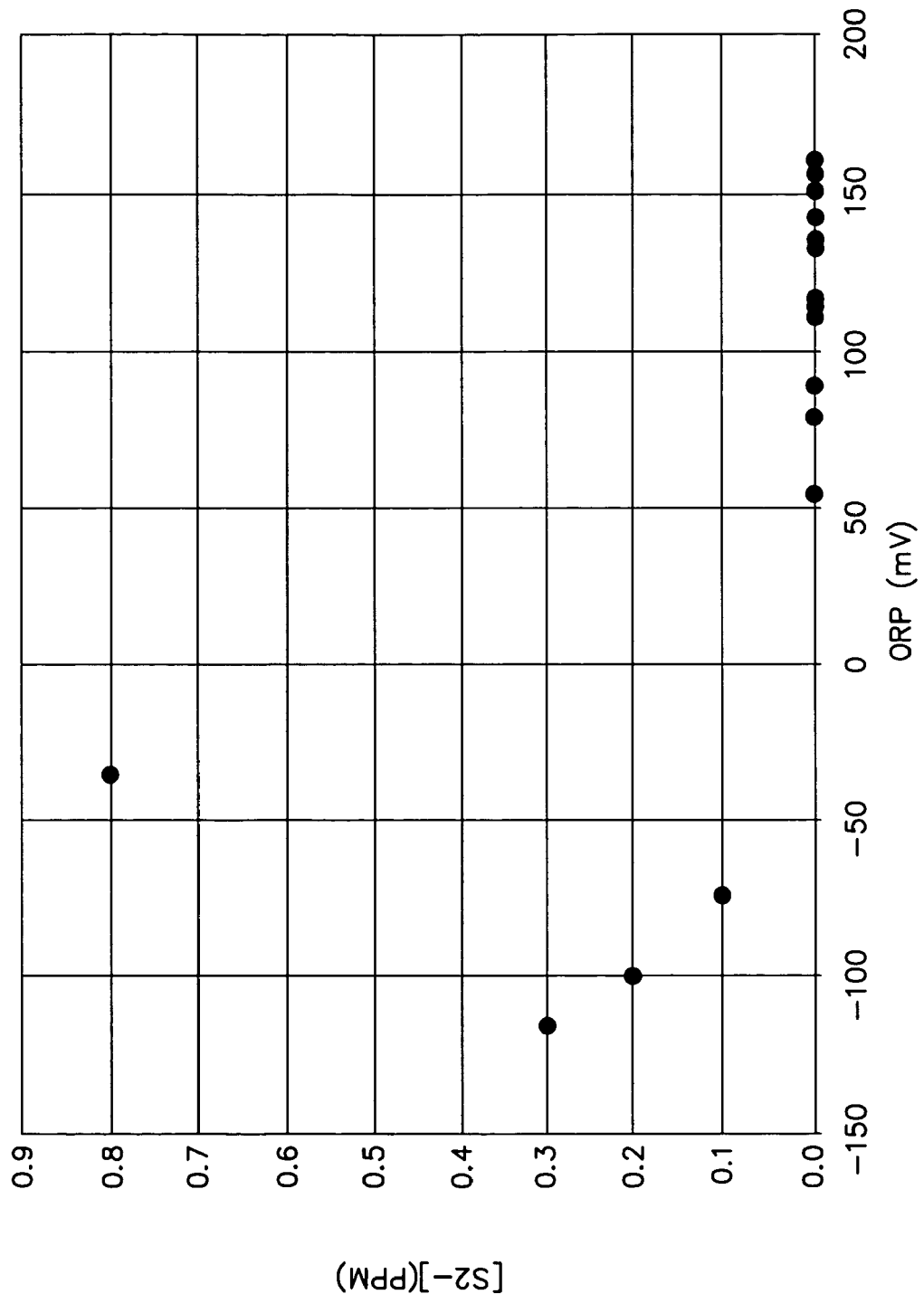
FIGS. 6A and 6B are graphs showing measured dissolved sulfide concentration (FIG. 6A) and nitrate species concentration (FIG. 6B) relative to measured oxidation-reduction potential of water in a sewer system treated in accordance with one or more embodiments of the invention.
Figure 6B:
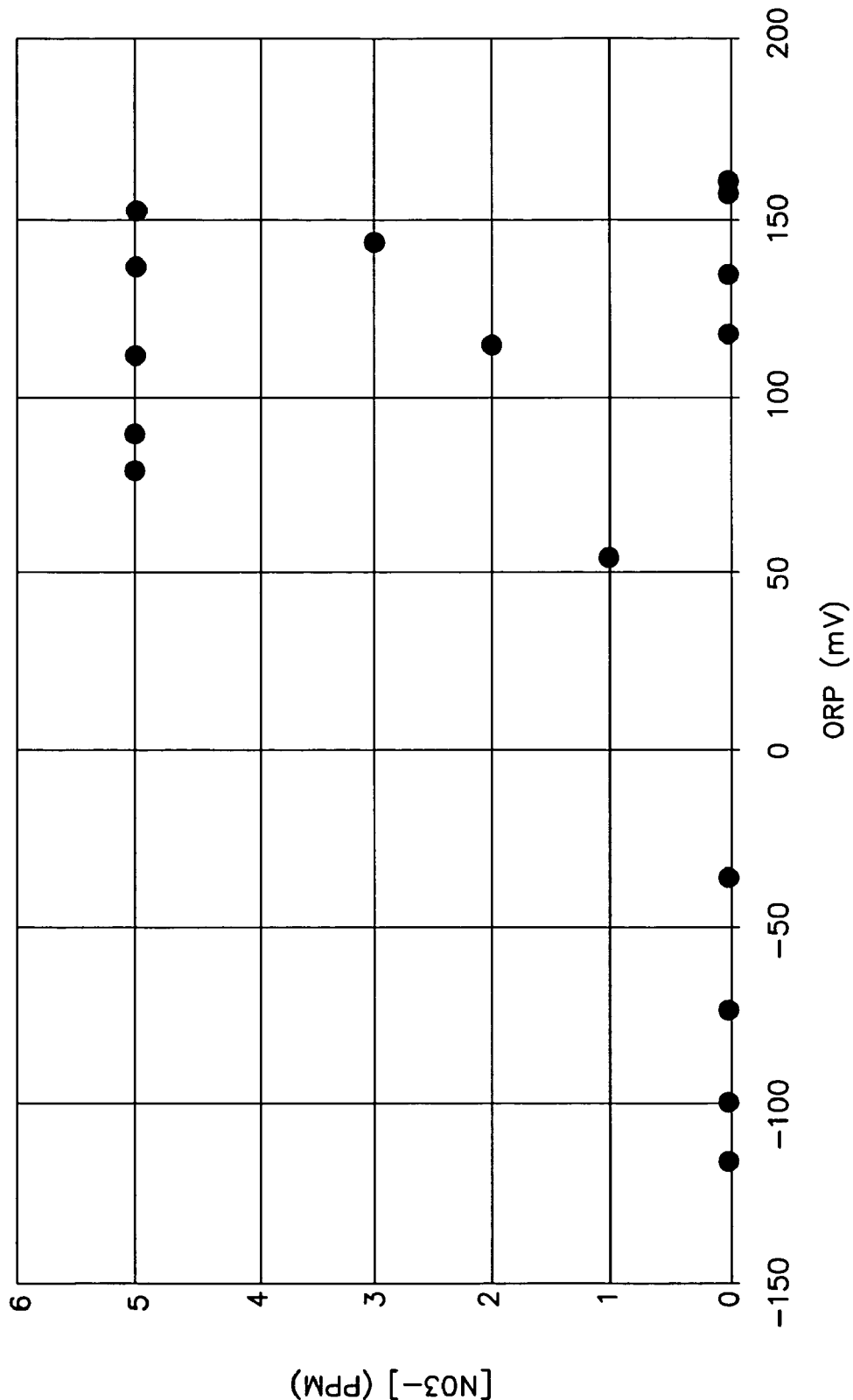

FIGS. 6A and 6B show that where the concentration of dissolved sulfide species is low, about 0 mg/L, residual nitrate species can be detected whereas where dissolved sulfide species remain above about 0 mg/L, relatively lower nitrate species can be measured. The former condition typically occurs at ORP values of about −50 mV or greater. In FIG. 6B, the corresponding concentration of nitrate species in the water stream was above trace levels when the ORP values are greater than about −50 mV.

Example 3

In another sewer system, the concentrations of the dissolved sulfide and nitrate species relative to the measured ORP were measured. The measured data are presented in FIGS. 7A and 7B. Treatment in the sewer system was effected by introducing BIOXIDE® treating agent at about 30 gallons per day along with about 20 gallons per day of about 50% caustic soda. The flow of the water to be treated was approximately 225,000 gallons per day in the sewer line. The separation distance between the point of introduction of the treating agent and the point of measurement was about 10,000 feet and the average detention time of the water stream was about 2.1 hours. Upstream of the point of introduction of the caustic soda, the pH of the water stream was in a range of about 7 to about 7.4 pH units and downstream thereof, at the point of measurement, the pH was in a range of about 8.42 to about 8.8 pH units.

Figure 7A:
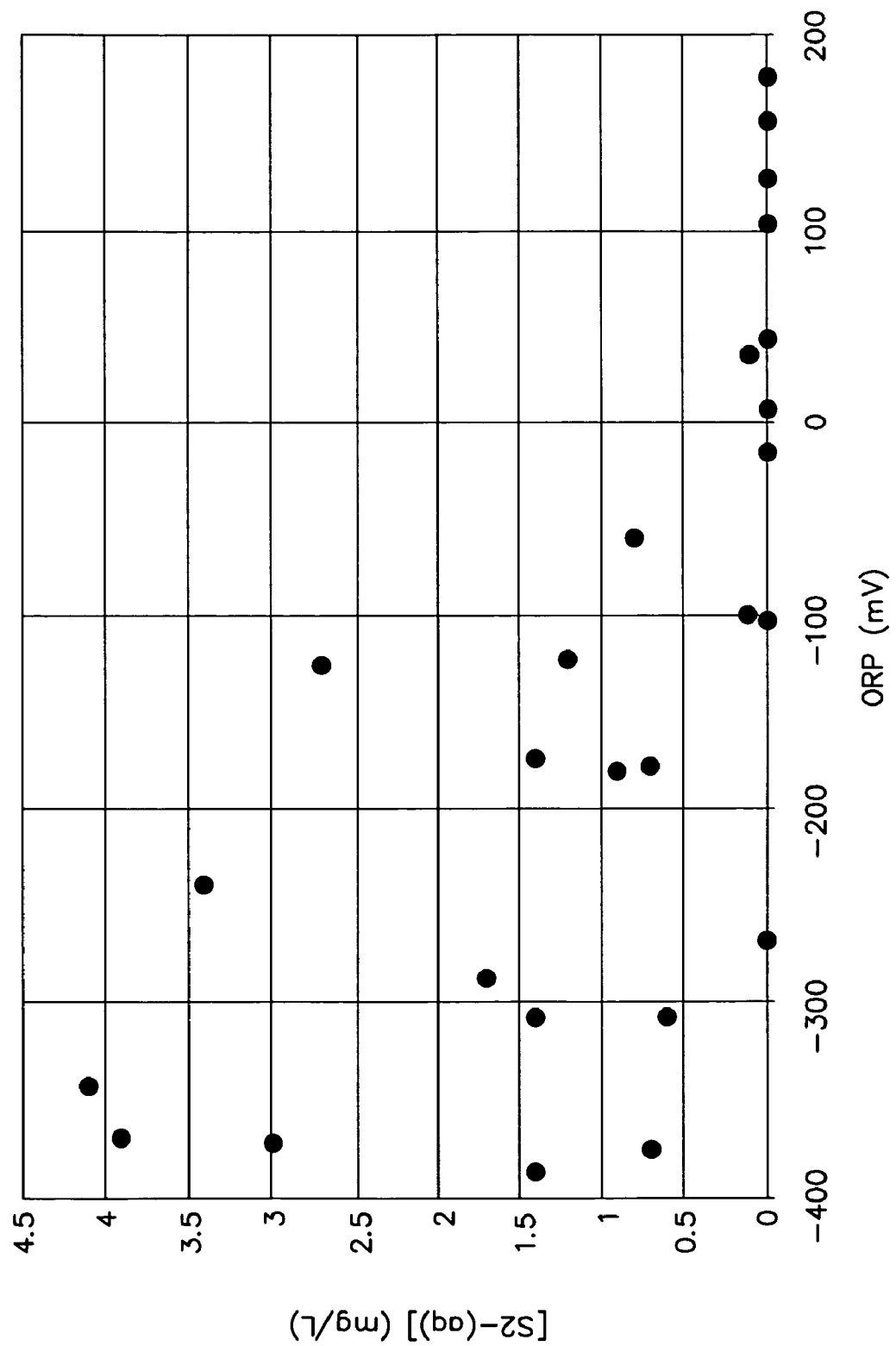
FIGS. 7A and 7B are graphs showing measured dissolved sulfide (FIG. 7A) and nitrate (FIG. 7B) concentrations relative to ORP in water in a sewer system treated in accordance with one or more embodiments of the invention.
Figure 7B:
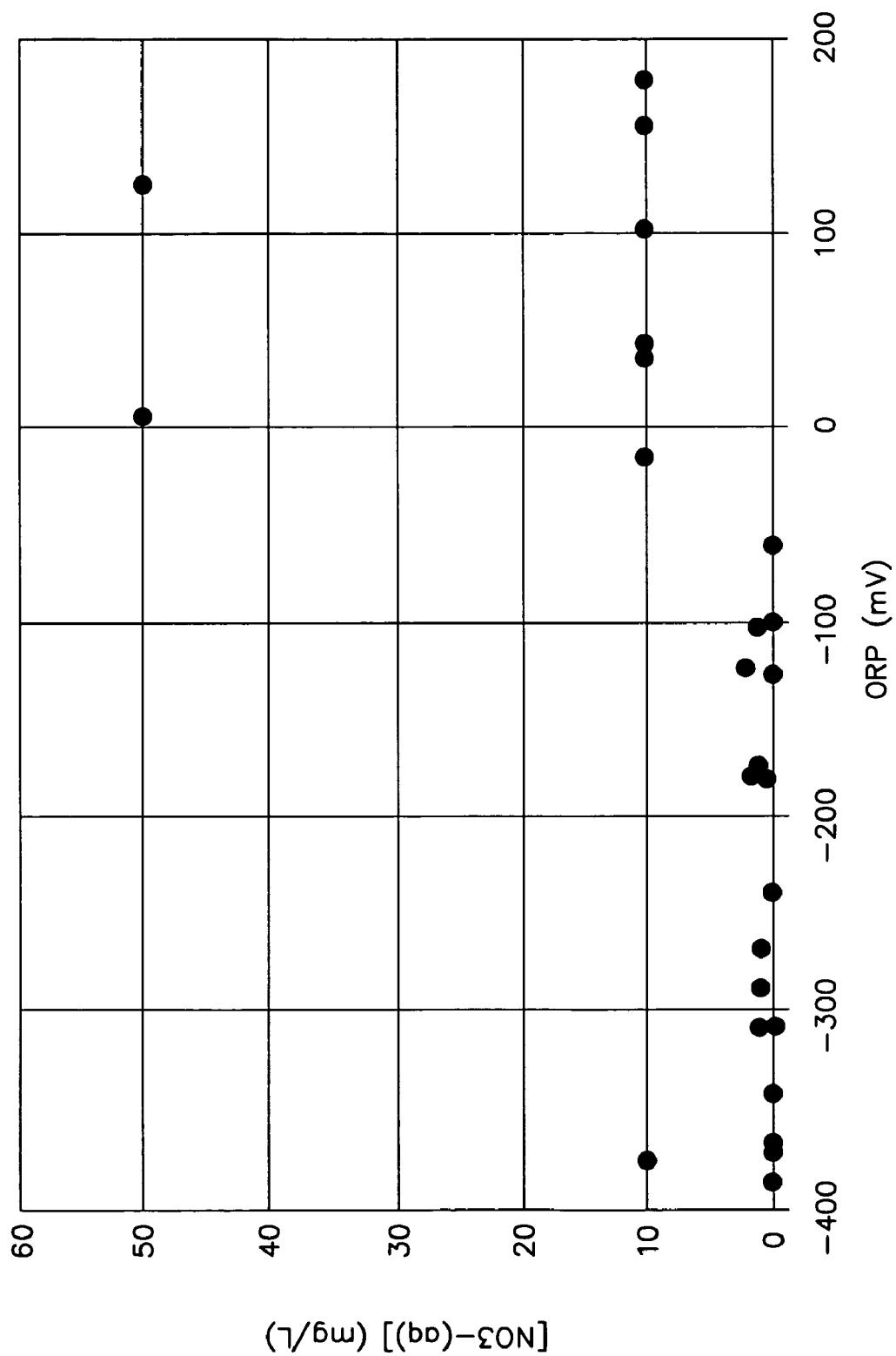

As shown in FIG. 7A, the concentration of dissolved sulfide species is no more than trace levels when ORP is greater than about −50 mV. Correspondingly, the concentration of nitrate species in the water stream is effectively down to trace levels when ORP is less than about −50 mV. Thus in this facility, maintaining an ORP of at least about −50 mV effectively reduced the amount of dissolved sulfide species concentration to about trace levels.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A wastewater odor control system comprising:
   a nitrate source disposed to introduce a nitrate species to a wastewater stream;
   a sensor disposed in the wastewater stream at a location downstream from a location of introduction of the nitrate source, and configured to transmit a signal corresponding to an ORP value of the wastewater stream, wherein a detention time of the wastewater system corresponds to a wastewater stream travel time between the nitrate source introduction location and the sensor location; and
   a controller disposed to receive the signal and configured to transmit a control signal to the nitrate source to adjust a rate of addition of the nitrate species introduced to the wastewater stream to effect a target ORP value in a range of about −75 mV to about +75 mV, and wherein the controller is further configured to transmit the control signal based on an ORP signal and the detention time.

2. The wastewater odor control system of claim 1, further comprising an alkali source disposed to introduce an alkali species in the wastewater stream.

3. The water treatment system of claim 2, further comprising a pH sensor disposed in the water stream and configured to measure a pH of the water stream and transmit a corresponding pH signal.

4. The water treatment system of claim 3, wherein the controller is configured to receive the pH signal and transmit a pH control signal to the alkali source that effects a water stream pH increase of at least about 0.5 pH unit.

5. The wastewater odor control system of claim 1, wherein the target ORP value is selected to provide an acceptable hydrogen sulfide concentration.

6. The wastewater odor control system of claim 5, wherein the target value of dissolved sulfide species in the wastewater stream is less than about 1 ppm.

7. The wastewater odor control system of claim 1, wherein the target ORP value is in a range of about −50 mV to about +50 mV.

8. The wastewater odor control system of claim 7, wherein the target ORP value is in a range of about −25 mV to about +25 mV.

9. The wastewater odor control system of claim 1, wherein the target ORP value is selected to be less than baseline ORP level of the wastewater stream.

10. A wastewater odor control system comprising:
a nitrate source disposed to introduce a nitrate species to a wastewater stream;
an alkali source disposed to introduce an alkali species in the wastewater stream;
a pH sensor disposed in the wastewater stream and configured to measure a pH of the wastewater stream and transmit a corresponding pH signal;
a sensor disposed in the wastewater stream and configured to transmit a signal corresponding to an ORP value of the wastewater stream;
a controller disposed to receive the signal and configured to transmit a control signal to the nitrate source to adjust a rate of addition of the nitrate species introduced to the wastewater stream to effect a target ORP value, and wherein the controller is further configured to receive the pH signal and transmit a pH control signal to the alkali source that effects a wastewater stream pH increase of at least about 0.5 pH unit; and
a storage device including a schedule defining a periodic demand of the wastewater stream.

11. The wastewater odor control system of claim 10, wherein the control signal is at least partially based on the periodic demand defined by the schedule.

12. The wastewater odor control system of claim 10, wherein the target ORP value is selected to correspond to a target value of dissolved sulfide species in the wastewater stream.

13. The wastewater odor control system of claim 12, wherein the target ORP value is selected to correspond to a target value of dissolved sulfide species of less than about 1 ppm.

14. The wastewater odor control system of claim 10, wherein the target ORP value is at least about −100 mV.

15. The wastewater odor control system of claim 14, wherein the target ORP value is in a range of about −75 mV to about +75 mV.

16. The wastewater odor control system of claim 15, wherein the target ORP value is in a range of about −50 mV to about +50 mV.

17. The wastewater odor control system of claim 16, wherein the target ORP value is in a range of about −25 mV to about +25 mV.

18. The wastewater odor control system of claim 10, wherein the target ORP value corresponds to a change of less than 200 mV relative to an expected ORP level of the wastewater stream.

* * * * *